US010152211B2

(12) United States Patent
Koushik et al.

(10) Patent No.: US 10,152,211 B2
(45) Date of Patent: Dec. 11, 2018

(54) APPLICATION DELIVERY AGENTS ON VIRTUAL DESKTOP INSTANCES

(71) Applicant: Amazon Technologies, Inc., Reno, NV (US)

(72) Inventors: Sheshadri Supreeth Koushik, Redmond, WA (US); Yang Lin, Seattle, WA (US); Rohit Krishna Kumar, Seattle, WA (US); Gevorg Karapetyan, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 890 days.

(21) Appl. No.: 14/538,734

(22) Filed: Nov. 11, 2014

(65) Prior Publication Data

US 2016/0132214 A1    May 12, 2016

(51) Int. Cl.
*G06F 9/455*   (2018.01)
*G06F 3/0484*  (2013.01)
(Continued)

(52) U.S. Cl.
CPC ........ *G06F 3/04842* (2013.01); *G06F 3/0482* (2013.01); *G06F 8/61* (2013.01);
(Continued)

(58) Field of Classification Search
None
See application file for complete search history.

(56) References Cited

U.S. PATENT DOCUMENTS 8,065,676 B1 *  11/2011  Sahai ............... G06F 9/5077
                                                   709/226
8,495,197 B1 *   7/2013  Nagargadde ......... G06F 9/5011
                                                   709/219
(Continued)

FOREIGN PATENT DOCUMENTS

WO         02/44892        6/2002

OTHER PUBLICATIONS

U.S. Appl. No. 14/516,233, filed Oct. 16, 2014, Sheshadri Supreeth Koushik.
(Continued)

*Primary Examiner* — Dong U Kim
(74) *Attorney, Agent, or Firm* — Robert C. Kowert; Meyertons, Hood, Kivlin, Kowert & Goetzel, P.C.

(57) ABSTRACT

A service provider system may include an application fulfillment platform that delivers desktop applications to end users (e.g., to physical computing devices or virtual desktop instances). An application delivery agent installed on an end user's device may send requests to access platform control plane services on behalf of the agent or the end user (along with security credentials) and may retrieve messages directed to the device from a queue on the platform. Messages may be placed in the queue by control plane services in response to agent requests. Messages may include instructions for the agent to perform installing, uninstalling, updating, or reinstalling a virtualized desktop application package on the device. The agent may request and retrieve (from the queue) information about the intended (or assumed) installation state of applications on the device, compare it to locally stored information about the actual state, and initiate corrective action, if needed.

20 Claims, 14 Drawing Sheets

(51) Int. Cl.
*G06F 3/0482* (2013.01)
*H04L 29/06* (2006.01)
*H04L 29/08* (2006.01)
*G06F 8/61* (2018.01)
*G06F 9/451* (2018.01)
*G06F 8/65* (2018.01)

(52) U.S. Cl.
CPC .............. *G06F 9/452* (2018.02); *G06F 9/455* (2013.01); *G06F 9/45533* (2013.01); *H04L 63/08* (2013.01); *H04L 63/10* (2013.01); *H04L 67/10* (2013.01); *H04L 67/34* (2013.01); *H04L 67/36* (2013.01); *G06F 8/65* (2013.01)

(56) References Cited

U.S. PATENT DOCUMENTS

| | | | |
|---|---|---|---|
| 8,972,485 | B1 | 3/2015 | French et al. |
| 9,069,607 | B1 | 6/2015 | Gopalakrishna Alevoor et al. |
| 2002/0032763 | A1 | 3/2002 | Cox et al. |
| 2002/0091697 | A1 | 7/2002 | Huang et al. |
| 2007/0256073 | A1* | 11/2007 | Troung ................. G06F 21/606 718/1 |
| 2009/0043840 | A1 | 2/2009 | Cherukuri et al. |
| 2009/0198805 | A1 | 8/2009 | Ben-Shaul et al. |
| 2010/0251242 | A1* | 9/2010 | Sivasubramanian ........................ G06F 17/30306 718/100 |
| 2011/0083138 | A1* | 4/2011 | Sivasubramanian ........................ G06F 17/30306 719/328 |
| 2011/0099147 | A1* | 4/2011 | McAlister ......... G06F 17/30581 707/639 |
| 2011/0277027 | A1 | 11/2011 | Hayton et al. |
| 2011/0295998 | A1 | 12/2011 | Ferris et al. |
| 2012/0084381 | A1* | 4/2012 | Alladi ..................... G06F 9/544 709/213 |
| 2012/0158819 | A1 | 6/2012 | Anderson et al. |
| 2012/0278439 | A1 | 11/2012 | Ahiska et al. |
| 2012/0304168 | A1 | 11/2012 | Raj Seeniraj et al. |
| 2013/0067345 | A1* | 3/2013 | Das .......................... G06F 8/63 715/740 |
| 2013/0073703 | A1 | 3/2013 | Das et al. |
| 2013/0104118 | A1* | 4/2013 | Somani ..................... G06F 8/61 717/173 |
| 2013/0117804 | A1* | 5/2013 | Chawla ................. H04L 63/102 726/1 |
| 2013/0151598 | A1 | 6/2013 | Fu et al. |
| 2014/0068599 | A1 | 3/2014 | Kannan et al. |
| 2014/0245282 | A1 | 8/2014 | Keith, Jr. |
| 2014/0258155 | A1* | 9/2014 | Suryanarayanan ..... H04L 63/10 705/318 |
| 2014/0280799 | A1 | 9/2014 | Hendry |
| 2014/0280961 | A1 | 9/2014 | Martinez et al. |
| 2015/0127774 | A1 | 5/2015 | Hitomi et al. |
| 2015/0227567 | A1 | 8/2015 | Zamir et al. |

OTHER PUBLICATIONS

Invitation to Pay Additional Fees from PCT/US2015/056045, dated Jan. 13, 2016, Amazon Technologies, Inc., pp. 1-7.
U.S. Appl. No. 15/012,049, filed Feb. 2, 2016, Kypros Constantinides.
Fisher, et al., "Virtualization: What does it mean for SAS," 2009, pp. 1-8.
International Journal of Education and Research, "Virtual Desktop Infrastructure Technology Based Study and Research," vol. 1., No. 4, Apr. 2013, pp. 1-10.
Microsoft, Windows Server 2012, "Virtualization Desktop Infrastructure," Microsoft, 2012, pp. 1-25.

\* cited by examiner

APPLICATION DELIVERY AGENTS ON VIRTUAL DESKTOP INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Many large companies are attempting to move data center resources to cloud computing environments. These companies may use large amounts of desktop computing software that must be procured, kept up-to-date, and distributed across many desktop computers in multiple locations. Traditionally, in order to execute an application, an end user within a company would log into a physical machine, navigate to a vendor site, download an application, physically install the application on their own computer (which may include choosing an option for automatically installing updates to the application or an option for receiving notifications of available updates), and execute the application locally (on their own computer). Subsequently, when and if the end user is finished using the application, the end user might uninstall the application.

For a large enterprise, it can be difficult to keep all of the applications they may wish to use up to date using the traditional approach of physically installing applications on each machine. For example, deploying and managing applications at scale is difficult, complex and requires expensive on premise infrastructure. In addition, updates and patches are complex to deploy without affecting user productivity, and legacy applications typically only run on older operation system versions. It can be difficult for a large enterprise to deploy applications on-demand and their own line-of-business applications. In many cases, there is a lack of transparency into cost controls, spending and usage related to desktop applications. Therefore, large enterprises can miss opportunities for license synergies across the organization.

Figure 1:
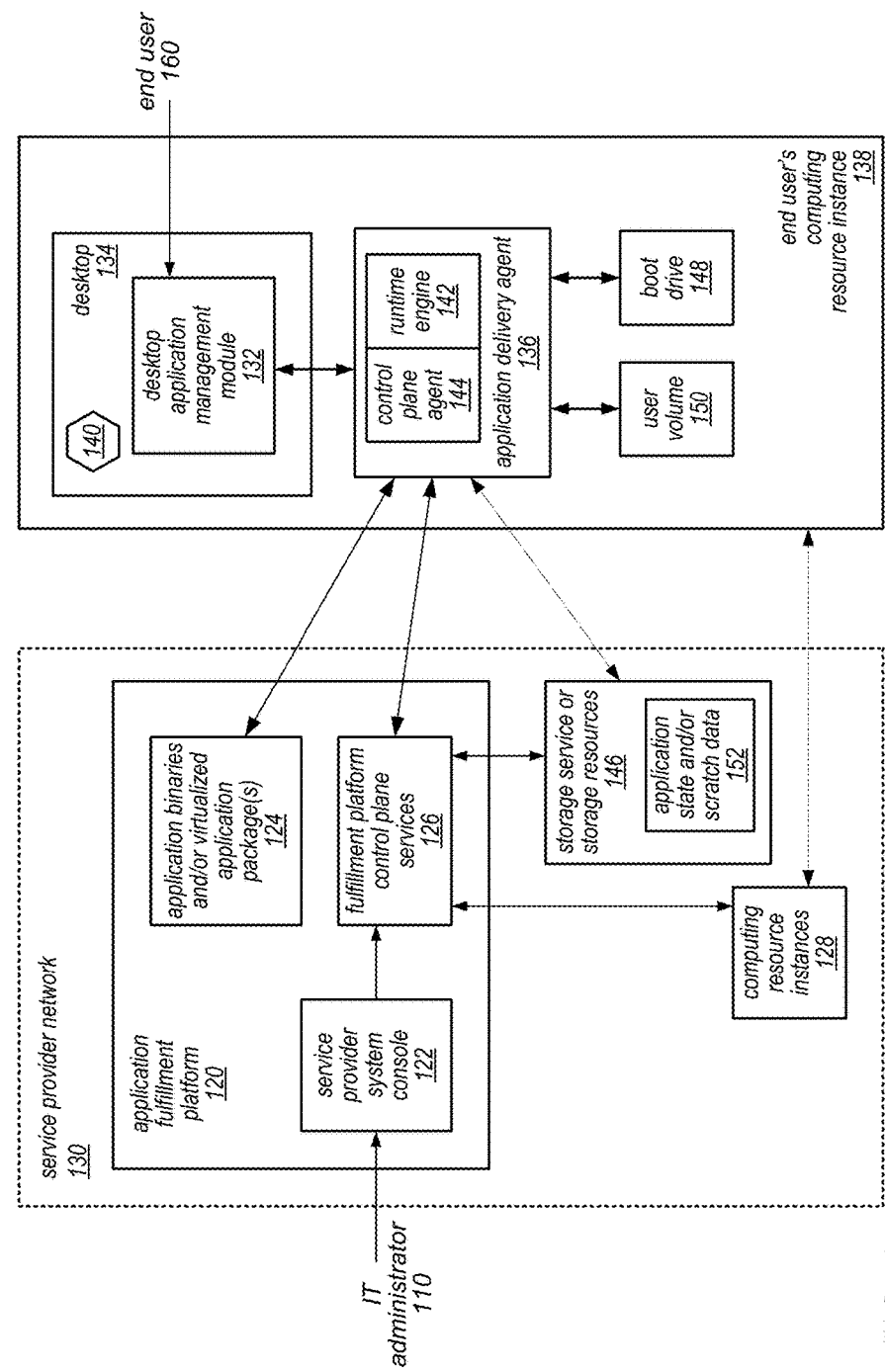
FIG. 1 is a block diagram illustrating one embodiment of a service provider system that is configured to provide on-demand delivery of applications to computing resource instances of its customers' end users.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for providing applications (e.g., desktop applications) through an application fulfillment platform in a service provider system that provides virtualized computing resources to clients are described herein. The systems and methods described herein may provide on-demand delivery and installation of desktop applications to virtual desktop instances in a cloud computing environment for the benefit of end users (e.g., employees or members of a business, enterprise, or other organization that is a customer of the service provider). In some embodiments, the application fulfillment platform may employ a variety of services to manage collections of applications (e.g., catalogs or portfolios of applications) and to deliver virtualized application packages to end user machines or virtual desktop instances. In some embodiments, the systems described herein for providing on-demand delivery and installation of desktop applications to virtual desktop instances may implement multiple authentication mechanisms (e.g., two or more authentication mechanisms with which end users may be registered and their identities authenticated and/or with which their computing resources instances may be separately registered and authenticated).

In some embodiments, customers of a service provider (e.g., buyers or IT administrators within an enterprise) may be able to discover and subscribe to third party applications (or applications that have been purchased or licensed from a third party by the service provider) on-demand and make them available to their end users on virtual desktop instances. In addition, an IT administrator of a customer may be able to publish and manage the customer's own line-of-business applications, which may be accessible only for their end users.

The systems described herein may provide customers the flexibility to build and curate a selection of applications (including those discovered and/or sourced through a desktop application management module) while maintaining secure, scalable and streamlined delivery of applications to their end users. In some embodiments, customers may benefit from on-demand access to applications (e.g., desktop applications) through flexibility, convenience and the use of a pay-as-you-go feature. In addition, customers may be able to manage their diverse application portfolios without making expensive up-front investments. The application fulfillment and management services provided by the systems described herein may be suitable for virtual computing instance customers (e.g., virtual desktop customers) in a variety of industries and sectors, including retailers, financial services providers, technology companies, and customers in the transportation sector.

In various embodiments, the application fulfillment platforms described herein may provide IT administrators full control over their virtual desktop instances with dynamic application management tools. For example, IT administrators in customer organizations may be able to build application catalogs or portfolios for their end users that are composed of applications from sourced through the platform and/or their own private applications, where a portfolio is a collection of applications and corresponding policies (including maintenance schedules and license types), which can be assigned to end users or groups of users. In some embodiments, at least some applications (e.g., required applications) may be pre-installed on the virtual desktop instances that are provisioned for a customer's end users. In some embodiments, customers may allow their end users to install applications on-demand. IT administrators may interact with the application fulfillment platforms through a management console (sometimes referred to herein as a service provider system console or an administrator console) that offers IT administrators access to the tools for managing catalogs or portfolios, application updates, policies, application licenses and/or their own private applications. These tools may include a dashboard that enables IT administrators to easily ingest, package and deliver private applications to their end users. In some embodiments, IT administrators may be able to fully control application updates, which may be installed in the background, and may be non-disruptive to users even if they are using an application that is being updated. The systems described herein may allow customers to efficiently manage their software application spending with detailed usage reports and monthly subscriptions. Because the service provider may be able to negotiate bulk and/or wholesale prices from application vendors, the service provider may be able to offer them to customer (e.g., individually or in bundles containing groups of popular applications) with competitive pricing.

As described in more detail below, the application fulfillment platforms described herein may provide a self-service model to end users through an application (e.g., a desktop application management module) on their virtual desktop instances. For example, through this application, end users can discover and manage an application portfolio that best fits their needs, with the ability to install applications marked as optional by their IT administrators. IT administrators may also have the option to authorize their users to be able to request access to additional applications and/or to receive notifications of new applications or application updates as they become available. In some embodiments, the application fulfillment platforms described herein may preserve application state by automatically backing up applications and application data, which may enable subsequent restoration (e.g., in the case of a machine failure), provide the ability to roll back the application state to a specific point in time, and/or provide the flexibility to work across multiple virtual desktop instance and/or computing devices.

In the context of the application fulfillment platforms described herein, the terms "customer" and "buyer" may refer to an enterprise, a business, or another organization that receives application management and/or fulfillment services on behalf of their end users from a service provider through such a platform. In this context, the term "sellers" may refer to software vendors that provide their applications for use within the application fulfillment platforms described herein, and the terms "users" and "end users" may refer to employees or members of the enterprise, business, or other organization that receives application management and/or fulfillment services on their behalf from a service provider through such a platform. Users may access applications that are fulfilled through these platforms on their own computing resources instances (e.g., on end user machines and/or virtual desktop instances).

In some embodiments, applications (e.g., desktop applications) may be delivered to various end users' virtual desktop instances using an application virtualization technology that allows safely encapsulates and isolates applications in dedicated containers. For example, a packaging service implemented on the application fulfillment platform may be configured to transform applications into virtualized application packages and to deliver them to virtual desktop instances or physical desktops running over an operating system on an end user's machine. The virtualized application packages, when executed, may perform and behave as if they are natively installed, without the need for actual installation. In some embodiments, this approach may simplify application patch management because patches do not need to be pushed to individual desktops. In some embodiments, the packaging service may be invoked by IT administrators or other IT professionals to convert and validate traditional desktop applications into virtual applications that are compatible with the application fulfillment platforms (and services thereof) that are described herein.

As described in detail herein, an application fulfillment platform may offer customers (or more specifically, IT administrators of those customers) the ability to provision applications on-demand at scale while maintaining centralized control, security and compliance. For example, in some embodiments, these platforms (and corresponding services thereof) may be integrated with a management console through which the IT administrators may discover and subscribe to a broad selection of applications from a variety of sources, build a catalog of applications from a variety of sources and having a variety of subscription/licensing models, control access to applications with granular access policy enforcement on a per user basis, manage application updates, access detailed usage reports for their enterprise, application portfolios and end users, and/or monitor real-time installs as well as license activation on a per application basis.

In some embodiments, the application fulfillment platforms described herein may be integrated with or may be configured to operate in conjunction with a service provider enterprise catalog, e.g., a service that enables administrators to create private catalogs of products and resources from a variety of suppliers, and to share them with a specific set of users. These products may include not only desktop applications to be delivered to virtual desktop instances as virtualized application packages, but may also include server applications (e.g., applications to be executed on a server on behalf of a customer or end user) and/or applications to be delivered as executable files (e.g., application binaries) to be installed on an end user's computing device or virtual desktop instance. If the service provider enterprise catalog is used to create a catalog or portfolio of desktop applications, these applications may be installed as virtualized application packages on an end user's computing resource instance at a later time (e.g., on-demand), as described herein. In some embodiments, the service provider enterprise catalog may enable administrators to offer a standard set of products that meet organizational requirements, and may offer users an opportunity to discover products via a familiar on-line-shopping-type experience, provision service provider resources for their own use, and/or manage service provider resources through a service provider system console. In some embodiments, organizations may benefit from the use of the service provider enterprise catalog through increased standardization, enforced compliance with policies, and improved agility.

As described in more detail herein, in some embodiments, an application fulfillment platform may receive input specifying an intended state of the platform for a given end user and may invoke various services and workflows to translate that intent into reality. This may include provisioning one or more applications on the end user's desktop (e.g., physically installing them on the user's machine, or installing them in a cloud computing environment through a virtual desktop instance). When the end user begins to use one of the applications, the application fulfillment platform (or a component thereof) may manage its subscription, which may trigger metering and billing messages (e.g., emails) and may involve managing third party software licenses for the application, in some cases.

As described herein, a whole enterprise (e.g., a service provider customer) may be represented in the service provider system (and/or in an application fulfillment platform of the service provider system) by an IT administrator who interacts with the system through service provider system console. After logging into the console, the IT administrator may be able to perform a variety of different actions, many of which fall into one of three broad categories. The first category involves action related to building their own catalog, which is a collection of applications that may include their own line-of-business (e.g., custom) applications, applications for which the enterprise has purchased licenses (which may be included in the catalog under a "bring your own license" model), and/or applications purchased from the service provider itself.

In a second category of actions, the IT administrator may (e.g., through the service provider system console) perform actions related to assigning particular applications to specific end users (and/or user groups). For example, an IT administrator may be able to select one or more end users and/or user groups in its active directory and may be able to assign applications (e.g., one or more desktop applications) to the selected end users and/or user groups. For example, the IT administrator may be able to assign an office productivity suite, a data analysis application and/or a browser application to the selected end user(s) and/or user group(s).

In a third category of actions, the IT administrator may (e.g., through the service provider system console) perform actions related to generating, obtaining, and/or viewing reports indicating the usage of the applications that are provided through the service to their end users. The information in these reports may be used by the IT administrator to determine which of several available licensing models may be most suitable for the software being used by their organization.

One embodiment of a service provider system that is configured to provide on-demand delivery of applications (e.g., desktop applications) to computing resource instances of its customers' end users is illustrated by the block diagram in FIG. 1. As illustrated in this example, the system, implemented on service provider network 130, may include an application fulfillment platform (shown as application fulfillment platform 120). The application fulfillment platform may include an interface mechanism (shown as service provider system console 122) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator (shown as IT administrator 110) may log into application fulfillment platform 120 (e.g., through a browser or a dedicated client-side application) to access service provider system console 122. The IT administrator 110 may then provide input (e.g., requests for service entered in a graphical user interface of service provider system console 122) in order to create a catalog of applications to be provisioned for the use of their end users, to assign applications to particular end users or user groups, or to generate, obtain, or view usage reports for the applications in the catalog by their end users.

As illustrated in this example, application fulfillment platform 120 may include multiple fulfillment platform control plane services 126, various ones of which may be invoked in response to the inputs received from the IT administrator 110. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identifier service, and/or a proxy service. These services, and other components of an application fulfillment platform such as application fulfillment platform 120, are described in more detail below, according to at least some embodiments. As illustrated at 124, in this example, applications may be delivered to an end user (such as end user 160) as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances.

In some embodiments, an application delivery agent (such as application delivery agent 136) and a desktop application management module (such as desktop application management module 132) may be installed on the end user's computing resources instance 138. In various embodiments, computing resource instance 138 may be a physical computing device (e.g., a desktop or laptop computer, a tablet computing device, or a smart phone) or may be a virtualized computing resource instance (e.g., one that implements a virtual desktop instance). Application delivery agent 136 (which may be a client component of application fulfillment platform 120) may be configured to communicate with various fulfillment platform control plane services 126 in order to fulfill requests to subscribe to, install, and/or execute applications selected through desktop application management module 132 or through another user interface mechanism (e.g., application icon 140 on desktop 134 or a start menu item). In other words, desktop application management module 132 is an application that may be installed on the end user's computing resource instance 138 to allow the end user 160 to interact with application fulfillment platform 120 through application delivery agent 136. In some embodiments, application delivery agent 136 may include a runtime engine component that is configured to execute the instructions of a virtualized application package 124 that is delivered (e.g., using demand paging) for a selected application. The functionality of an application delivery agent is described in more detail below, according to at least some embodiments.

As illustrated in FIG. 1, the service provider network may include physical and/or virtualized computing resource instances (e.g., computation resource instances and/or storage resource instances) that may be provisioned on behalf of the business, enterprise, or organization (and its end users). In some embodiments, these computing resources instances (shown as computing resource instances 128 on service provider network 130) may be configured to implement a remote computing application that allows an end user 160 to access applications executing on computing resource instances 128 as if they were installed and executing locally on their machine. For example, in some embodiments, one or more of these computing resources instances 128 may be configured to implement a virtual desktop instance (which may serve as the end user's computing resource instance 138) on which an application delivery agent 136 and a desktop application management module 132 are installed. In such embodiments, desktop 134 in FIG. 1 may represent a view presented by the virtual desktop instance and may appear to the end user 160 as if it were a desktop on the end user's local (physical) computing device. In some embodiments, service provider network 130 may also include storage resources outside of application fulfillment platform 120 (which may be managed by a storage service implemented within service provider network 130) that are configured to store data utilized by application fulfillment platform 120. In various embodiments, application binaries, virtualized application packages, various tables that store information about applications and collections thereof, application state data (which may include application templates, application configuration information, and/or other types of application settings), scratch data generated by various applications, or other information used to provide on-demand delivery of desktop applications to end users may be stored outside of application fulfillment platform 120 instead of, or in addition to, within application fulfillment platform 120. For example, application state and/or scratch data (shown as application state and/or scratch data 152) may be stored by a storage service or storage resources (such as storage service or storage resources 142) on service provider network 130. In various embodiments, a storage service 142 may be an object storage service, a file storage service, a database service or any other type of storage service to which application state and/or scratch data can be stored and from which this data can be subsequently retrieved.

As illustrated in this example, desktop application management module 132 (through which the end user 160 may select applications for installation or execution) may execute on the end user's computing resource instance 138, and a graphical user interface of desktop application management module 132 may be displayed on desktop 134. For example, this interface may present a list of applications for selection by the end user 160 (e.g., in order to subscribe to, install, and/or execute an application). In addition, a shortcut or icon for an application (shown as element 140 in FIG. 1) may be displayed on desktop 134 and may be selected in order to launch the corresponding application (e.g., desktop application management module 132, or one of the applications delivered for execution on computing resource instance 138 in response to its selection, by the end user 160, within desktop application management module 132). As illustrated in this example, two separate storage volumes (shown as user volume 150 and boot drive 148) may be installed on the end user's computing resource instance 138. For example, in some embodiments, applications that are delivered to the end user's computing resource instance 138 by the application fulfillment platform may be installed on boot drive 148, and any application state data and/or scratch data that is generated during the building or use of these applications may be written to user volume 150. Note that in embodiments in which the end user's computing resource instance 138 is a virtualized computing resource instance, boot drive 148 and/or user volume 150 may be implemented by computing resources instances 128 on the service provider network 130.

Figure 13:
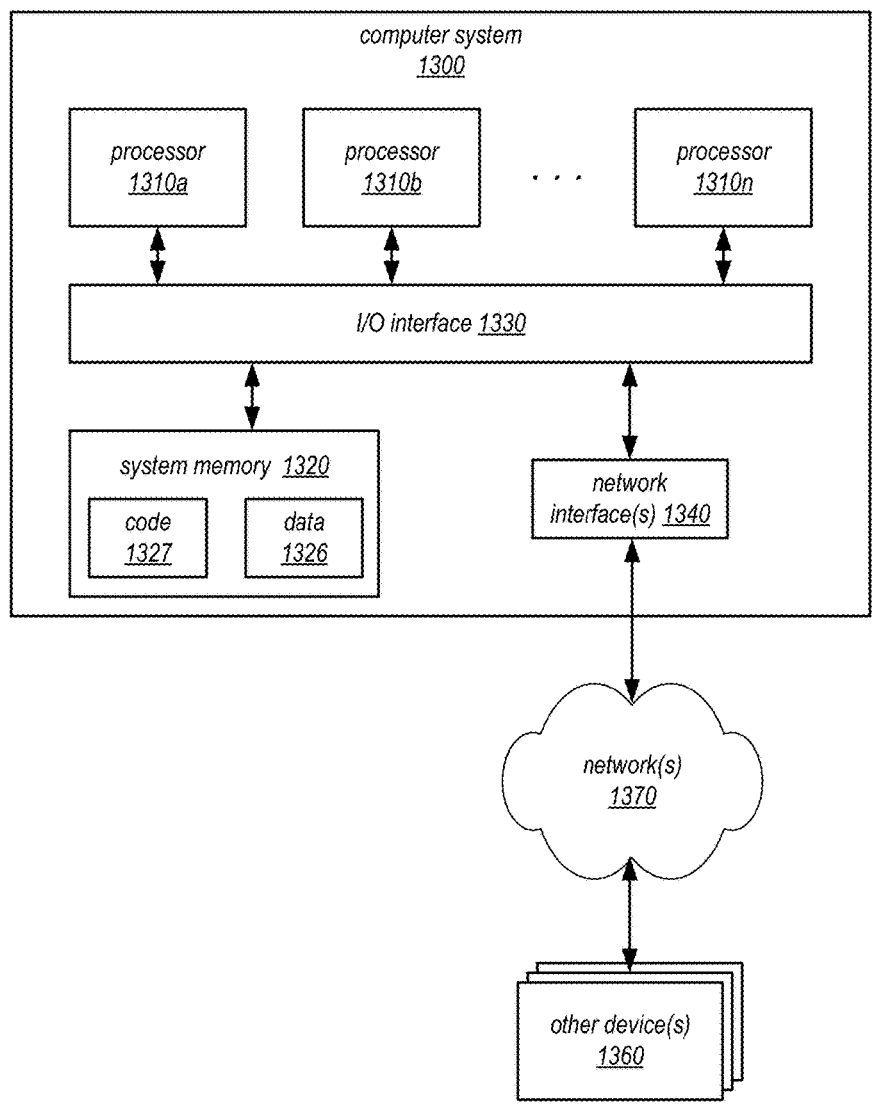
FIG. 13 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for providing on-demand delivery of desktop applications to desktops on physical computing devices and/or virtual desktops in a cloud computing environment described herein may be implemented is illustrated in FIG. 13. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 2-4, 6, and 13 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via application programming interfaces (APIs) to the services to obtain and configure resource instances and to establish and manage virtual network configurations that include the resource instances, for example virtualized private networks.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

Figure 2:
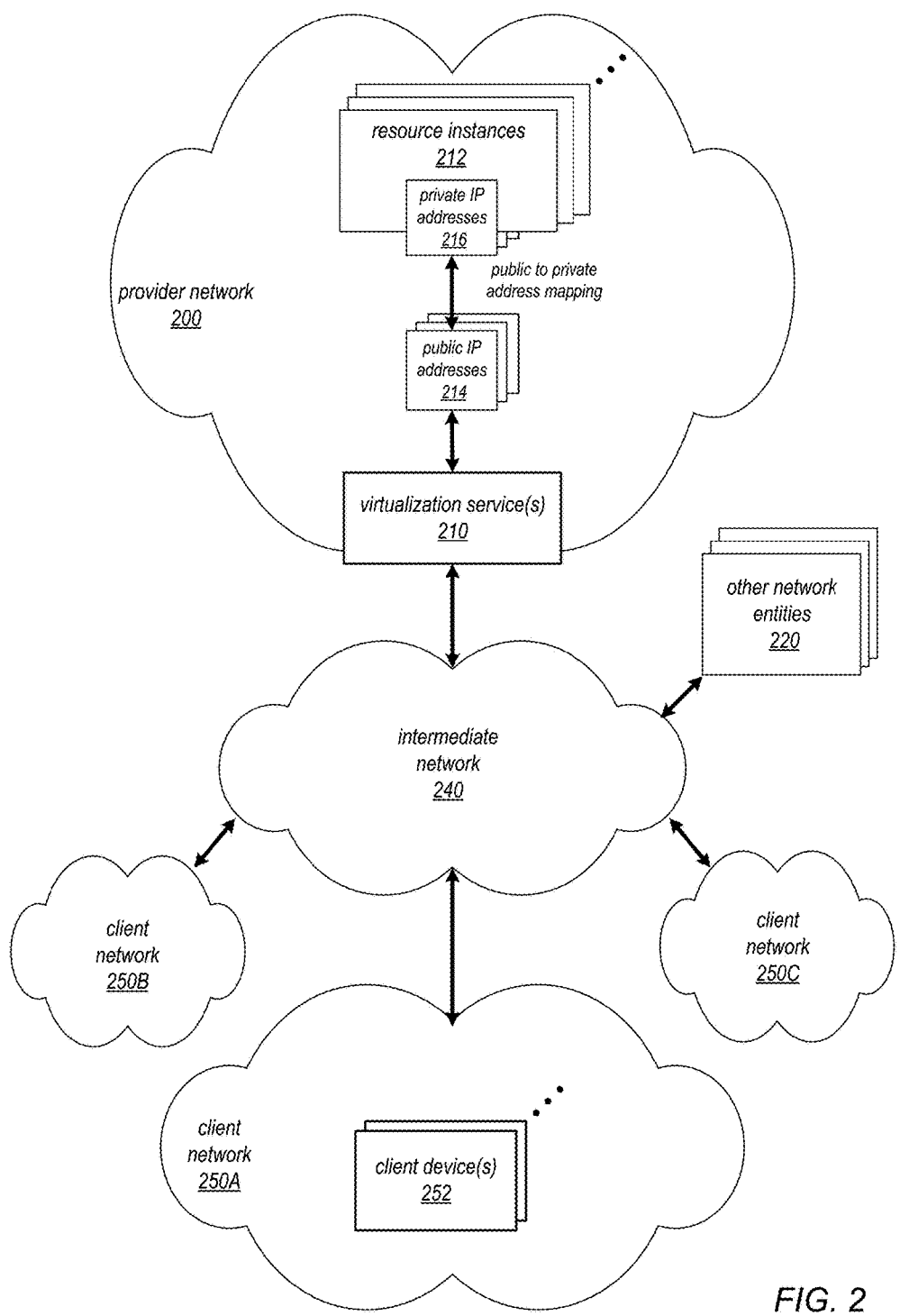
FIG. 2 is a block diagram illustrating an example provider network environment, according to at least some embodiments.

FIG. 2 illustrates an example provider network environment, according to at least some embodiments. A provider network 200 may provide resource virtualization to clients via one or more virtualization services 210 that allow clients to purchase, rent, or otherwise obtain instances 212 of virtualized resources, including but not limited to computation and storage resources, implemented on devices within the provider network or networks in one or more data centers. As described in more detail below, in some embodiments, provider network 200 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 200. Private IP addresses 216 may be associated with the resource instances 212; the private IP addresses are the internal network addresses of the resource instances 212 on the provider network 200. In some embodiments, the provider network 200 may also provide public IP addresses 214 and/or public IP address ranges (e.g., Internet Protocol version 4 (IPv4) or Internet Protocol version 6 (IPv6) addresses) that clients may obtain from the provider 200.

Conventionally, the provider network 200, via the virtualization services 210, may allow a client of the service provider (e.g., a client that operates client network 250A, 250B, or 250C, each of which may include one or more client devices 252) to dynamically associate at least some public IP addresses 214 assigned or allocated to the client with particular resource instances 212 assigned to the client. The provider network 200 may also allow the client to remap a public IP address 214, previously mapped to one virtualized computing resource instance 212 allocated to the client, to another virtualized computing resource instance 212 that is also allocated to the client. For example, using the virtualized computing resource instances 212 and public IP addresses 214 provided by the service provider, a client of the service provider such as the operator of client network 250A may implement client-specific applications and present the client's applications on an intermediate network 240, such as the Internet. Other network entities 220 on the intermediate network 240 may then generate traffic to a destination public IP address 214 published by the client network 250A; the traffic is routed to the service provider data center, and at the data center is routed, via a network substrate, to the private IP address 216 of the virtualized computing resource instance 212 currently mapped to the destination public IP address 214. Similarly, response traffic from the virtualized computing resource instance 212 may be routed via the network substrate back onto the intermediate network 240 to the source entity 220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 200; a client may then assign their allocated public IP addresses to particular resource instances allocated to the client. These public IP addresses may be referred to as client public IP addresses, or simply client IP addresses. Instead of being assigned by the provider network 200 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 212 that are made available to clients (e.g., client devices 252) via virtualization service(s) 210 may include multiple network interfaces. For example, some of them may include one network interface for communicating with various components of a client network 250 and another network interface for communicating with resources or other network entities on another network that is external to provider network 200 (not shown).

Figure 3:
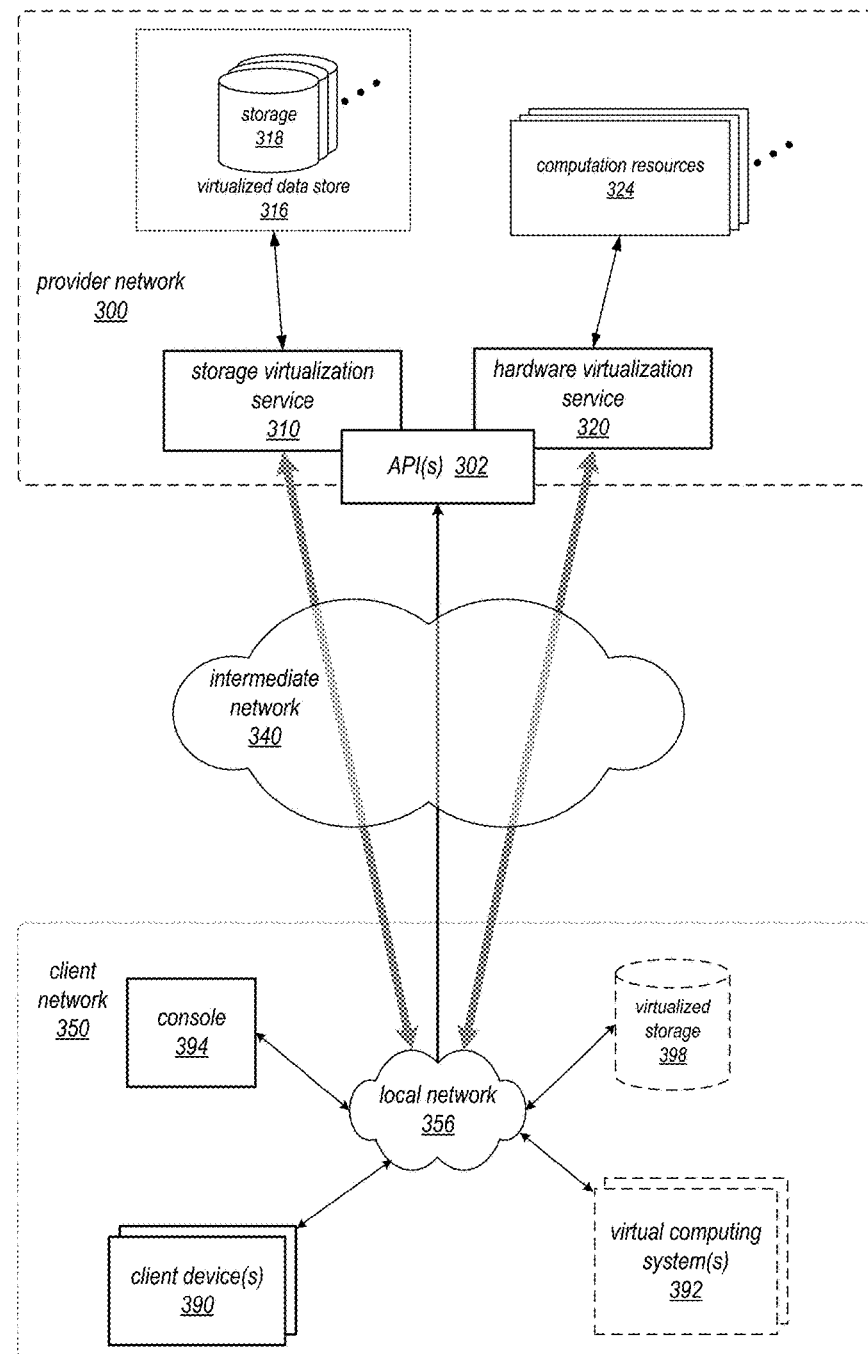
FIG. 3 is a block diagram illustrating an example provider network that provides a storage virtualization service and a hardware virtualization service to clients, according to at least some embodiments.

FIG. 3 is a block diagram of another example provider network environment, one that provides a storage virtualization service and a hardware virtualization service to clients, according to at least some embodiments. In this example, hardware virtualization service 320 provides multiple computation resources 324 (e.g., VMs) to clients. The computation resources 324 may, for example, be rented or leased to clients of the provider network 300 (e.g., to a client that implements client network 350). As noted in the previous example, in some embodiments, provider network 300 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 300. In this example, each computation resource 324 may be provided with one or more private IP addresses. Provider network 300 may be configured to route packets from the private IP addresses of the computation resources 324 to public Internet destinations, and from public Internet sources to the computation resources 324.

Provider network 300 may provide a client network 350, for example coupled to intermediate network 340 via local network 356, the ability to implement virtual computing systems 392 via hardware virtualization service 320 coupled to intermediate network 340 and to provider network 300. In some embodiments, hardware virtualization service 320 may provide one or more APIs 302, for example a web services interface, via which a client network 350 may access functionality provided by the hardware virtualization service 320, for example via a console 394. In at least some embodiments, at the provider network 300, each virtual computing system 392 at client network 350 may correspond to a computation resource 324 that is leased, rented, or otherwise provided to client network 350.

From an instance of a virtual computing system 392 and/or another client device 390 or console 394, the client may access the functionality of storage virtualization service 310, for example via one or more APIs 302, to access data from and store data to a virtual data store 316 provided by the provider network 300. In some embodiments, a virtualized data store gateway (not shown) may be provided at the client network 350 that may locally cache at least some data, for example frequently accessed or critical data, and that may communicate with virtualized data store service 310 via one or more communications channels to upload new or modified data from a local cache so that the primary store of data (virtualized data store 316) is maintained. In at least some embodiments, a user, via a virtual computing system 392 and/or on another client device 390, may mount and access one or more storage volumes 318 of virtual data store 316, each of which appears to the user as local virtualized storage 398.

While not shown in FIG. 3, the virtualization service(s) may also be accessed from resource instances within the provider network 300 via API(s) 302. For example, a client, appliance service provider, or other entity may access a virtualization service from within a respective private network on the provider network 300 via an API 302 to request allocation of one or more resource instances within the private network or within another private network. Note that in some embodiments, the hardware virtualization service 320 may be configured to provide computation resources 324 that have been configured to implement a virtual desktop instance, which may appear to the user as a local desktop (implemented by a virtual computing system 392). Note also that in some embodiments, the computation resources 324 that are made available to the client via hardware virtualization service 320 may include multiple network interfaces. For example, some of them may include one network interface for communicating with various components of client network 350 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given while using the virtual desktop instance. In some embodiments, this may include one or more desktop applications that are packaged as virtualized application packages and that are provided on-demand through an application fulfillment platform implemented on resources of the service provider network. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 4:
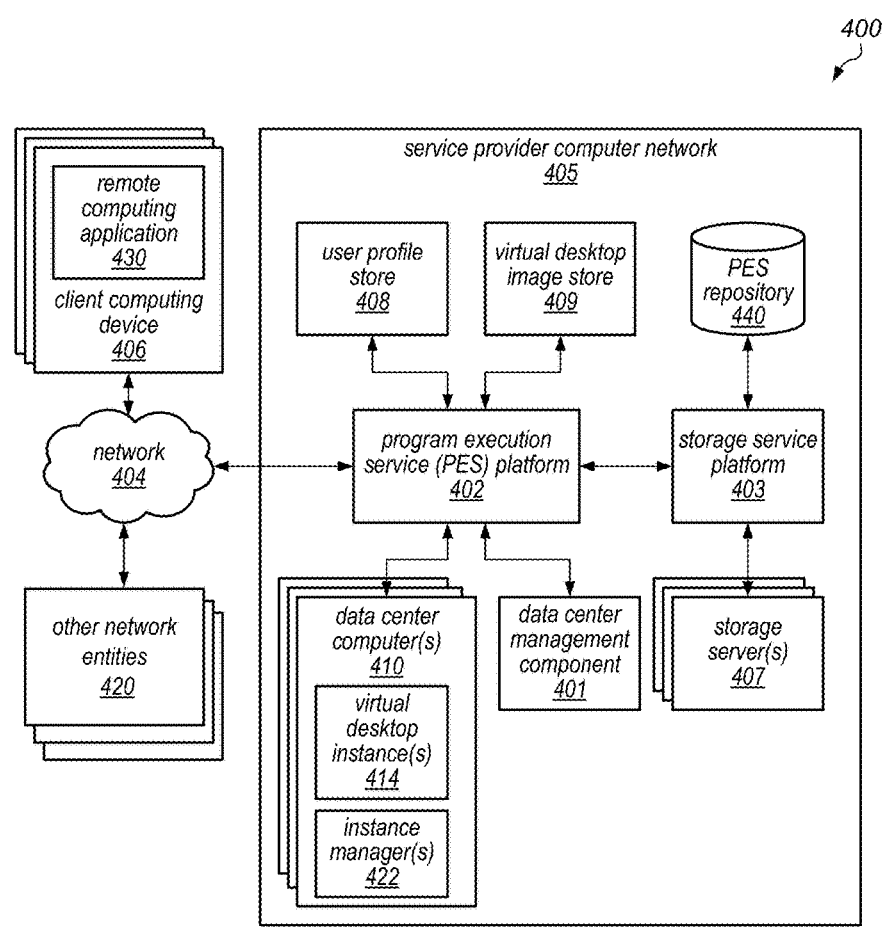
FIG. 4 is a block diagram illustrating a networked computing environment that includes a client computing device in communication with a service provider computer network, according to at least some embodiments.

FIG. 4 is a block diagram illustrating an example networked computing environment 400 that includes a client computing device 406 in communication with a service provider computer network 405 via the communication network 404. The client computing device 406 may be used for providing access to a remote operating system and applications to a user. In various embodiments, the client computing device 406 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 406 includes necessary hardware and software components for establishing communications over a communication network 404, such as a wide area network or local area network. For example, the client computing device 406 may be equipped with networking equipment and browser software applications that facilitate communications via the Internet or an intranet. The client computing device 406 may have varied local computing resources such as central processing units and architectures, memory, mass storage, graphics processing units, communication network availability and bandwidth, etc.

In one embodiment, the client computing device 406 may run a remote computing application 430. The remote computing application 430 may request access to a virtual desktop instance hosted by the service provider computer network 405. The remote computing application 430 may also manage the remote computing session between the client computing device 406 and the service provider computer network 405. As illustrated in FIG. 4, the service provider computer network 405 may also include a PES platform 402. The PES platform 402 illustrated in FIG. 4 corresponds to a logical association of one or more data centers associated with a service provider. The PES platform 402 may be associated with a number of data center computers, such as, for example, data center computers 410. Each data center computer 410 may host one or more virtual desktop instances 414. For example, the data center computer 410 may host a virtual desktop instance by executing a virtual machine on a physical device. The virtual machine may execute an instance of an operating system and application software to create a virtual desktop instance. Each virtual desktop instance executed by the PES 402 may be accessed by one or more client computing devices, such as client computing device 406.

In some embodiments, data center computers 410 may be associated with private network addresses, such as IP addresses, within the service provider computer network 405 such that they may not be directly accessible by the client computing devices 406. The virtual desktop instances 414 may be associated with public network addresses that may be made available by a gateway at the edge of the service provider computer network 405. Accordingly, the virtual desktop instances 414 may be directly addressable by client computing devices 406 via the public network addresses. One skilled in the relevant art will appreciate that each data center computer 410 would include physical computing device resources and software to execute the multiple virtual desktop instances 414 or to dynamically instantiate virtual desktop instances 414. Such instantiations can be based on a specific request, such as from the client computing device 406.

As illustrated in FIG. 4, the data center computers 410 may include one or more instance managers 422. The instance managers 422 may be on the same computer as the respective instances 414, or on a separate computer. The instance managers 422 may track progress of the instances executed on the data center computers 410, monitor and coordinate the storage of data created by the user while interacting with the instances 414 via the client computing devices, and monitor the overall health and state of the data center computers 410 and of the remote computing applications running on the client computing devices 406. The instance managers 422 may communicate information collected through tracking and monitoring with the data center management component 401 of the PES platform 402 in order to efficiently manage the various remote computing sessions between the data center computers 410 and the client computing devices 406.

As illustrated in FIG. 4, the service provider network 405 may also include a storage service platform 403. The storage service platform 403 may include, or be connected to, one or more storage servers 407. The storage servers 407 may be used for storing data generated or utilized by the virtual desktop instances 414. The data generated or utilized by the virtual desktop instances 414 may be based on the interaction between the client computing devices 406 and the PES 402 via one or more remote computing sessions.

In some embodiments, the storage service platform 403 may logically organize and maintain information associated with a hosted virtual desktop instance 414 in a desktop store. The information associated with a virtual desktop instance 414 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 405 may be able to mitigate the effect of failures of the data center computer(s) 410 running the virtual desktop instances 414 or errors associated with the execution of virtual desktop instances 414 on the data center computer(s) 410 by storing data on storage servers independent from the data center computers 410. Additionally, the service provider network 405 may also facilitate client interaction with multiple virtual desktop instances 414 by maintaining the information in the desktop stores. In some embodiments, if one virtual desktop instance 414 fails, a new instance may be launched and attached to the same desktop store that was previously attached to the virtual desktop instance 414 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 414 loses its connection to the desktop store, the PES 402 may switch the connection of the virtual desktop instance 414 from the desktop store to the back-up desktop store.

As illustrated in FIG. 4, the PES platform 402 may also include a central storage device such as a PES repository 440 for storing data stored by the various desktop stores and backup stores on storage servers 407. The data center computers 410 and the storage servers 407 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 405 may include a user profile store 408. The user profile store 408 may be used to store, for example, various programs a user is given access to while using a virtual desktop instance 414. In some embodiments, this may include one or more desktop applications that are packaged as virtualized application packages and that are provided on-demand through an application fulfillment platform implemented on resources of the service provider network 405. The user profiles stored may also indicate a maximum time or cost associated with the remote computing sessions of different users. The PES platform 402 may take user profiles into consideration when placing, configuring, and/or managing virtual desktop instances 414. The PES platform 402 may also include, or be connected to, a virtual desktop image store 409. The virtual desktop image store 409 may include template images of operating systems without customizations applied per user profiles.

In some embodiments, data center computers 410 and storage servers 407 may be considered to be logically grouped, regardless of whether the components, or portions of the components, are physically separate. For example, a service provider computer network 405 may maintain separate locations for providing the virtual desktop instances 414 and the storage components. Additionally, although the data center computers 410 are illustrated in FIG. 4 as logically associated with a PES platform 402, the data center computers 410 may be geographically distributed in a manner to best serve various demographics of its users. Additionally, one skilled in the relevant art will appreciate that the service provider computer network 405 may be associated with various additional computing resources, such additional computing devices for administration of content and resources, and the like. For example, the service provider computer network 405 (and/or various ones of the virtual desktop instances 414 implemented thereon) may be configured to communicate with other network entities 420 over communication network 404 or over another communication network (e.g., at least some of the virtual desktop instances 414 may include a network interface usable to access one or more other network entities 420 that is separate and distinct from to a network interface that is usable to communicate with client computing device 406). These other network entities 420 may include, for example, other client networks or computing devices thereof, computing systems that provide resources for servicing requests received from client computing device 406, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 430. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may have (or request) access. In some cases, the determination may be made on historical usage data of a user, which the PES platform 402 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 4 above. In some embodiments, the remote computing application 430 may request that a virtual desktop session be opened on behalf of the client, in response to which a virtual desktop instance 414 may be instantiated, configured for the use of the client, and/or connected to the client computing device 406 over network 404 (e.g., via a network interface of the virtual desktop instance 414).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of desktop applications (e.g., as virtualized application packages) to virtual desktop instances, as described herein.

In some embodiments, these virtual desktop instances may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credentials presented by the user upon logging into the virtual desktop instance have been authenticated.

As previously noted, in some embodiments, an application (which is sometimes referred to herein as a desktop application management module) may be installed on an end user's machine or on a virtual desktop instance that provides an interface to virtualized desktop applications delivered from an application fulfillment platform. In some embodiments, this application may also provide an interface through which applications that are (or can be) physically installed on the end user's machine may be installed or launched. For example, after launching the desktop application management module (e.g., by selecting an icon or shortcut on the desktop or on a virtual desktop), an end user may, through a graphical user interface of the desktop application management module, log into the desktop application management module using their identity, view a list of applications that are available for their use (e.g., applications that they have permission to purchase, lease or subscribe to, install, and/or execute) or that may be made available for their use (e.g., applications for which they may be able to request permission to purchase, lease or subscribe to, install, and/or execute) and select on option to purchase, lease or subscribe to, install, and/or execute one of the listed applications.

One embodiment of a graphical user interface 500 for a desktop application management module that is installed on an end user's computing resource instance, such as desktop application management module 132 illustrated in FIG. 1 or desktop application management module 658 illustrated in FIG. 6 and described below, is illustrated by the block diagram in FIG. 5A. In this example, an end user has chosen to view applications that are assigned to the end user or are part of a catalog of applications made available to the end user and/or one or more other end users by an IT administrator in the same business, enterprise, or organization ("my desktop applications"). In response to this selection, a list of applications is presented to the end user. In this example, the list of applications indicates, for each application, an application name, the vendor from which the application is sourced, and an available action that can be taken for the application (e.g., "install", for an application that is not currently installed on the end user's computing resource instance, or "uninstall", for some of the applications that are currently installed on the end user's computing resource instance). Note that for several of the applications, the action is shown as "required." This may indicate that these applications must be installed on the end user's computing resource instance (e.g., they may have been installed automatically when the computing resource instance was configured or when the desktop application management module was launched) and cannot be uninstalled (until and unless this requirement changes). Note that one of the applications in the list (a task tracking tool) was developed by the end user's company and ingested by the service provider for management through the application fulfillment platform. Applications may be listed in any order, in different embodiments, e.g., in alphabetical order by name or vendor, by application type (e.g., productivity applications, data analysis applications, line-of-business applications, etc.), or by availability (e.g., required applications, optional applications that have been installed, optional applications that have not been installed, etc.). As illustrated in this example, the end user may have the option to search the list of applications in order to display specific ones of the applications in the user interface for the desktop application management module. Note that this catalog may include customer-specific line-of-business applications (such as the task tracking tool described above); applications that were developed and/or published by the service provider; applications that were developed, published, and/or otherwise sourced by an entity other than the end user's company or the service provider and that were purchased or licensed by the service provider for the benefit of service provider customer and their end users; and/or applications that were developed, published, and/or otherwise sourced by an entity other than the end user's company or the service provider and that were purchased or licensed by the end user's company for the benefit of their end users.

Figure 5A:
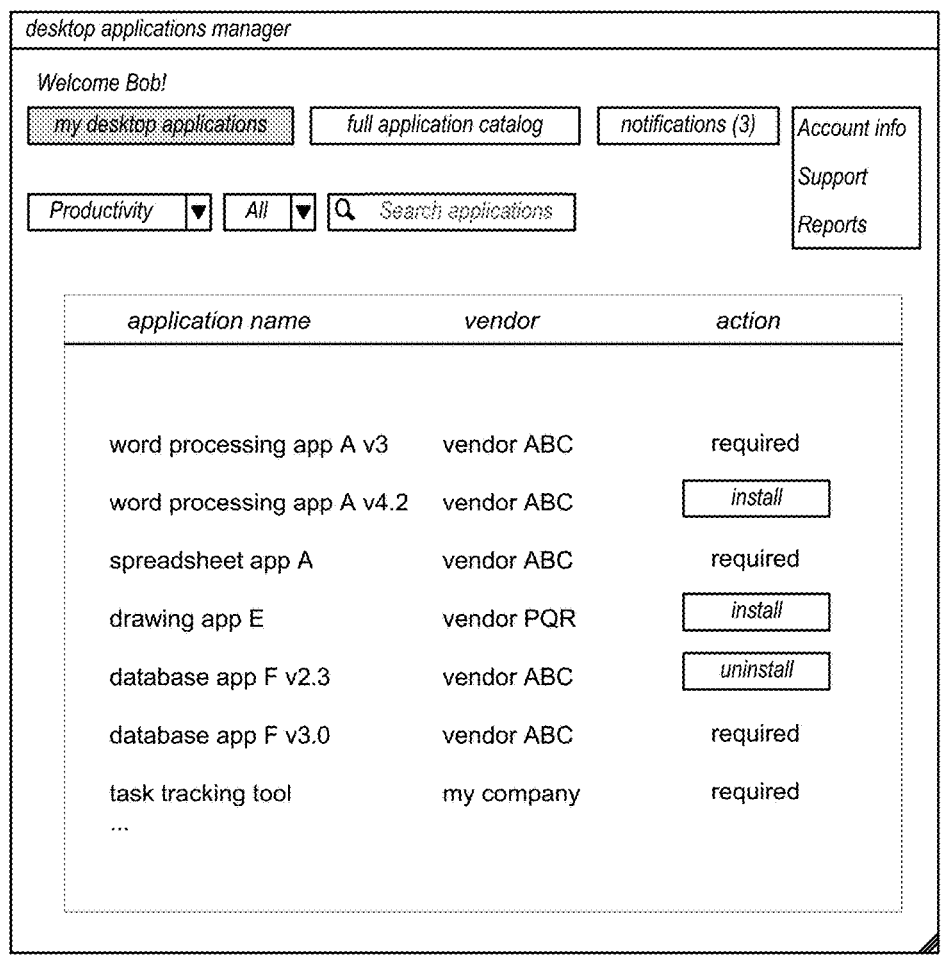
FIGS. 5A and 5B illustrate examples of the information presented through a graphical user interface for a desktop application management module, according to at least some embodiments.
Figure 5B:
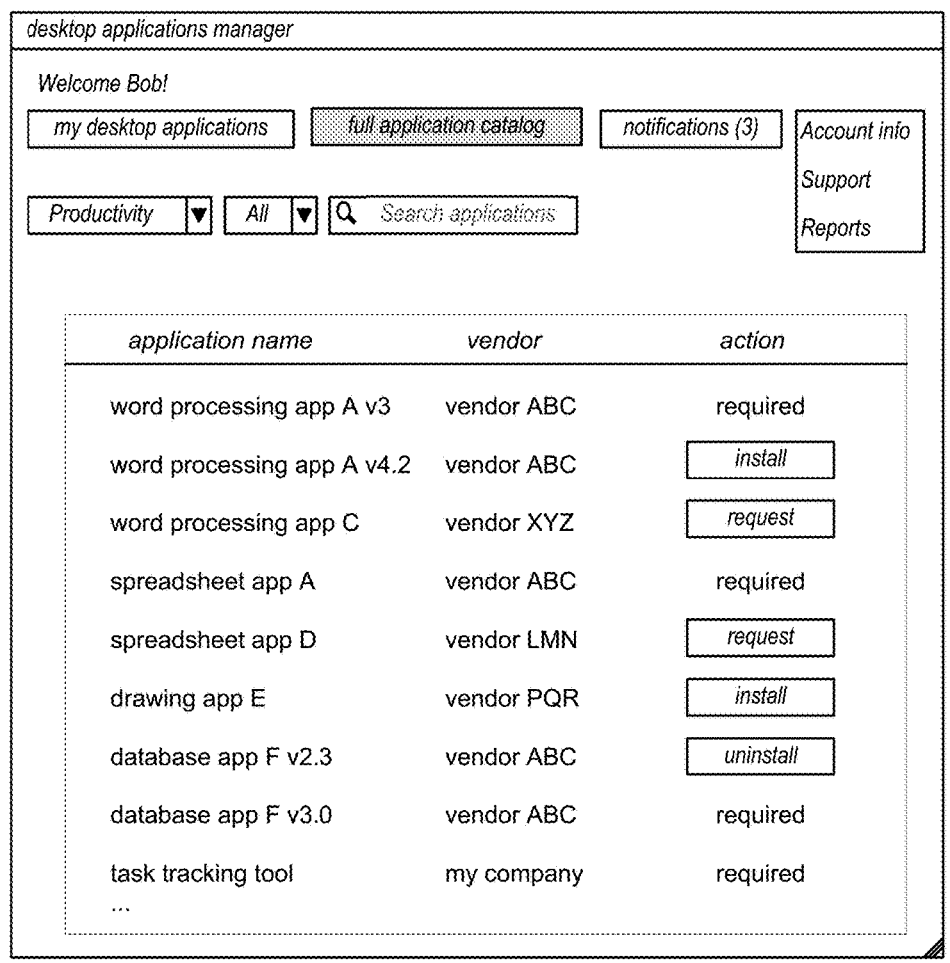

As illustrated in this example, in some embodiments the end user may (e.g., based on constraints or permissions applied by their IT administrator) have the option to view a "full application catalog." FIG. 5B illustrates the graphical user interface 500 of FIG. 5A when the end user has chosen to view information about the full application catalog. As in the previous example, this catalog may include customer-specific line-of-business applications (such as the task tracking tool described above), applications developed and/or published by the service provider, and/or applications developed and/or published by someone other than the end user's company or the service provider. However unlike in the example illustrated in FIG. 5A, the full application catalog displayed in FIG. 5B may include customer-specific line-of-business applications, applications developed and/or published by the service provider and/or third party applications that have not been assigned to the end user or that are included in a catalog that is made available to the end user by their IT administrator (including some for which the business, enterprise, or organization does not yet have a subscription or license) instead of, or in addition to, applications that are included in a catalog of applications made available to the end user and/or one or more other end users by an IT administrator (whether or not the applications are assigned to the end user). For example, the list of applications presented in the graphical user interface illustrated in FIG. 5B includes a word processing application (word processing app C) and a spreadsheet application (spreadsheet app D) that are not currently assigned to the end user or included in the catalog presented in FIG. 5A. In this case, the end user may select a "request" action in order to request access to (e.g., a subscription to) one of these applications. If the application has not yet been licensed by the service provider or the end user's company, selecting this action may, if the request is approved, initiate the acquisition and/or licensing of the application by the service provider or the end user's company and the ingestion of the application into the application fulfillment platform.

Note that, as illustrated in both FIG. 5A and FIG. 5B, in some embodiments, the end user may also have the option to view "notifications" through the user interface of the desktop application management module. For example, the end user may receive a notification when a new application is made available to the end user individually, is added to a catalog of applications that are assigned or otherwise to the end user, or is added to the full application catalog, or when a new generation or version of an application to which the end user is currently subscribed is made available.

As illustrated in both FIG. 5A and FIG. 5B, the end user may request one or more reports (e.g., through selection of the "Reports" item in the user interface of the desktop application management module). As described above, these reports (which provide usage information for various applications, such as those applications that are assigned or available to the end user) may be generated on demand (e.g., in response to requests from an IT administrator or end user) or periodically, and may be presented to an IT administrator or end user when they are generated or upon request, according to various embodiments. Note that the graphical user interface 500 may, in other embodiments, display more, fewer, or different elements than those illustrated in the examples shown in FIG. 5A and FIG. 5B. For example, in some embodiments, an additional user interface element may display a list of top rated (or most heavily used) applications for this enterprise or for all customers, links to ratings or reviews of applications, or any other information about applications that are currently available to (or may be request by) the end user.

As noted above, in at least some embodiments, a service provider system may include an application fulfillment platform that is configured to provide on-demand delivery of applications (e.g., as virtualized application packages) to end users of service provider customers. FIG. 6 is a block diagram illustrating components of an application fulfillment platform, including components of the platform that execute on an enterprise system 602, a service provider network 600 (which includes a fulfillment platform control plane 606), and an end user system 608, that collectively provide on-demand delivery of desktop applications to various end users of service provider customers, according to at least some embodiments. The functionality of various ones of the components of the application fulfillment platform illustrated in FIG. 6 are described in more detail below. As illustrated in this example, an IT administrator may access a service provider system console 616 in the fulfillment platform control plane 606 through an interface mechanism of the enterprise system 602 (e.g., enterprise system browser 604). Note that, as described above in reference to FIG. 1, service provider network may also include physical and/or virtualized computing resource instances (e.g., computation resource instances and/or storage resource instance) and other storage resource (e.g., storage resources managed by a storage service) within or outside of the application fulfillment platform and its control plane 606 (not shown).

Figure 6:
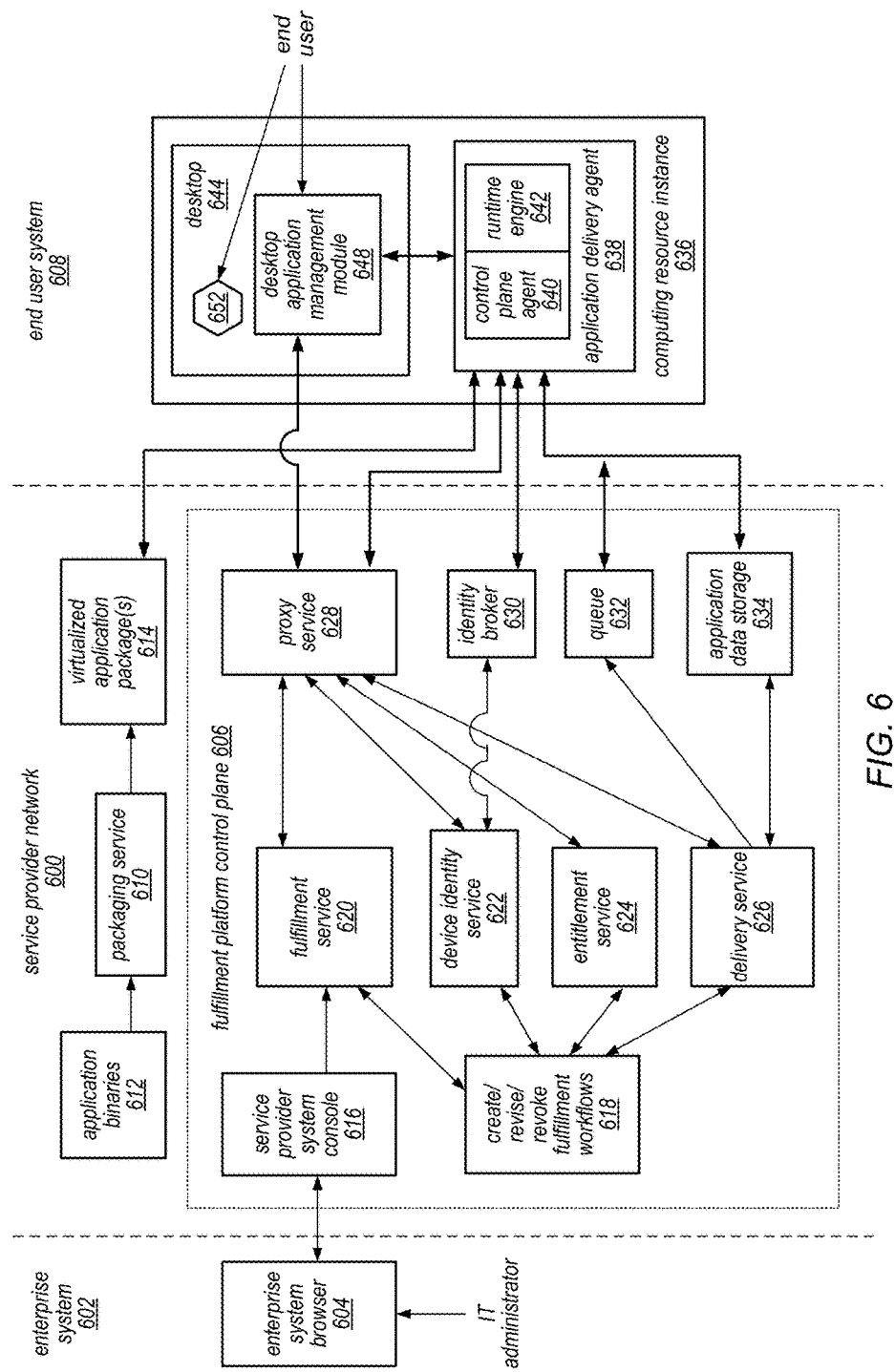
FIG. 6 is a block diagram illustrating components of an application fulfillment platform that provides on-demand delivery of applications to end users of service provider customers, according to one embodiment.

As illustrated in FIG. 6 and described in more detail below, fulfillment platform control plane 606 may include resources configured to implement a number of services used in providing on-demand delivery of applications to end users. For example, fulfillment platform control plane 606 may include a fulfillment service 620, which may be configured to initiate various workflows 618 (e.g., a create/revise fulfillment workflow and/or a revoke fulfillment workflow). These workflows may, in turn, invoke various operations of a device identity service 622, an entitlement service 624, and/or a delivery service 626. Fulfillment platform control plane 606 may also include a proxy service 628 (through which components of the end user system 608 may interact with at least some of the services implemented on fulfillment platform control plane 606) and an identity broker service 630.

As illustrated in this example, fulfillment platform control plane 606 may include a queue 632 (into which messages may be placed for subsequent retrieval by control plane agent 640 of end user system 608) and an application data storage component 634 (which may be configured to store application state data, application templates, or other application data, as opposed to any outputs or artifacts generated by the execution of an application). Fulfillment platform control plane 606 may also include a packaging service 610, which may be invoked by the service provider in order to transform executable files of a desktop application that are ingested into and/or stored on fulfillment platform control plane 606 (such as application binaries 612) into virtualized application packages (such virtualized application packages 614) for subsequent delivery to end user system 608 to fulfill a request for delivery of an application.

As previously noted, an end user's desktop (such as desktop 644 of end user system 608) may be implemented on a physical computing resource instance 636 (e.g., using physical hardware on the end user's local machine) or on a virtual desktop instance 636 (e.g., executing on one or more computing resource instances on machines at the service provider), either of which may run an operating system. As illustrated by the example in FIG. 6, in some embodiments of the application fulfillment platforms described herein, some components of the platform may be client-side components that are implemented (or that appear to an end user as if they were implemented) on end user system 608. For example, end user system 608 may include a computing resource instance 636, which may include a physical computer (e.g., a physical desktop or laptop computer or another type of physical computing device) and/or a virtualized computing resource instance (which may be implemented by physical resources of the application fulfillment platform or other physical resources of the service provider's system). In some embodiments, virtual desktop instances may be domain joined. For example, they may be joined to a service provider domain and/or to their own domains (e.g., their own company/enterprise domains). As illustrated in FIG. 6, an application delivery agent 638 and a desktop application management module 648 may be installed on (and may execute on) computing resource instance 636.

As illustrated in this example, a desktop application management module 648 may present on desktop 644 an interface through which the end user can interact with application fulfillment platform 606 to request and receive desktop applications on-demand. For example, an interface of this application may present a list of applications for selection by the end user (e.g., in order to subscribe to, install, and/or execute an application). In some embodiments, other user interface mechanisms, such as a shortcut or icon (shown as 652) through which the desktop application management module 648 or another selected application may be launched by an end user are presented on desktop 644. As illustrated in this example, an application delivery agent, which may include a control plane agent component 640 (e.g., one that is configured to interact with the fulfillment platform control plane 606) and a runtime engine component 642 (e.g., one that is configured to execute virtualized applications on behalf of the end user), may be implemented on the end user's computing resource instance 636. In some embodiments, the end user and/or control plane agent 640 may communicate with various ones of the services and resources provided by fulfillment platform control plane 606 through proxy service 628. The runtime engine component 642 may sometimes be referred to as a "player".

In some embodiments, various communication feeds (e.g., from service provider system console 616 and/or an intermediate service that processes some or all of the inputs received through service provider system console 616) may provide inputs to the fulfillment platform control plane 606, which is configured to provision the applications that are the subject of notifications to end users, according to the information about the application, the end users, and/or the constraints that is communicated by the communication feeds or that is otherwise discovered by the services of the fulfillment platform control plane 606. In some embodiments, the fulfillment platform control plane 606 may include multiple components that collectively provide services within the application fulfillment platform (e.g., internal services that perform functions on behalf of other ones of the services) and/or provide services to (or on behalf of) IT administrators or end users, including, but not limited to, a fulfillment service, a device identity service (which may be used in validating unique device identifiers), an entitlement service, a delivery service, and a proxy service.

Fulfillment Service:

In some embodiments, the fulfillment service (such as fulfillment service 620 illustrated in FIG. 6) may act as a central hub of the application fulfillment platform. For example, it may receive communication feeds (e.g., a listing feed and/or a principal feed) from the service provider system console 616, receive requests for subscribing to or unsubscribing from applications from end users (e.g., from control plane agents 640 executing on their computing resource instances 636 through proxy service 628) and/or may receive a notification when a new computing resource instance (e.g., a new virtualized computing resource instance and/or virtual desktop instance) is provisioned for an end user. In some embodiments, if (or when) a request is made (e.g., by an IT administrator) to provision or deprovision a computing resource instance (e.g., a virtualized computing resource instance or virtual desktop instance), an end user submits a request to subscribe to or unsubscribe from an application or to install, unstill, or launch an application, or an IT administrator submits a request or command that expresses some other intent, these requests/commands may be passed from the console to the fulfillment service 620 for handling.

In some embodiments, the fulfillment service 620 may maintain a record (e.g., a list) of the intended state of the application fulfillment platform for each user, which may detail the resources (including applications) that are intended to be assigned and/or provided to the end user. Inputs indicating the intended state may be received from the IT administrator (e.g., through service provider system console 616) or from an end user's machine (e.g., from control plane agent 640, through proxy service 628). For example, an IT administrator may, through a communication feed, provide input indicating that user1 belongs to a particular user group and has access to one or more specified applications according to specified constraints. In response to receiving one of such communication feeds, the fulfillment service may be configured to determine the appropriate action to take. For example, the fulfillment service may determine that it should provision a requested application (e.g., an application that specified in the received input as being part of the intended state for the end user), revoke access to an given application (if the application is not specified in the received input as being part of the intended state for the end user), or do nothing (e.g., if the current state for the end user matches the intended state for the user). Once the appropriate action is determined, the fulfillment service may initiate the execution of a corresponding workflow 618 for creating or revising an application fulfillment (e.g., a "create fulfillment" workflow, or a "revoke fulfillment" workflow). These workflows may then use one or more other services to actually provision or revoke the target applications. In some embodiments, rather than taking immediate action, application fulfillment platform control plane 606 may store the input indicating the intended state of the application fulfillment platform for a given end user for subsequent corrective action. In some such embodiments, the control plane agent 640 installed on an end user's computing resource instance 636 may be configured to poll the application fulfillment platform control plane 606 to determine the intended state (e.g., by reading the recorded intended state). In such embodiments, the control plane agent 640 may be configured to determine whether the current state matches the intended state, and if not, to initiate the taking of corrective action (e.g., initiating the performance of a "create fulfillment" workflow, or a "revoke fulfillment" workflow) through a communication with fulfillment service 620 (through proxy service 628).

In various embodiments, a "create fulfillment" workflow may include one or more of the following operations: delivering an executable application for installation in an end user's computing resource instance (such as an application binary 612) or a virtualized application package for the application to be executed on a virtualized computing resource instance or virtual desktop instance without installing the application itself on the virtualized computing resource instance or virtual desktop instance (such as one of the virtualized application packages 614 illustrated in FIG. 6), applying one or more constraints on use of the application by one or more end users (e.g., an environmental constraint, an input parameter constraint, a quota, or a billing constraint), assigning the application to one or more end users, adding a reference to an application to a list of applications presented by a desktop application management module 648 on desktop 644, modifying a reference to an application on a list of applications presented by desktop application management module 648 to indicate that the application is currently available for execution on the end user's computing resource instance, or creating a user interface element on desktop 644 (such as icon 652 or a start menu item) whose selection launches the application.

Similarly, a "revoke fulfillment" workflow may, in at least some embodiments, include one or more of the following operations: revoking an assignment of an application to one or more end users, delivering instructions to an agent (such as control plane agent 640) to remove or uninstall an executable application (such as an application binary 612) or a virtualized application package (such as virtualized application package 614) for the application from the computing resource instance 636, removing a reference to an application from a list of applications presented by desktop application management module 648, modifying a reference to an application on a list of applications presented by desktop application management module 648 to indicate that the application is not currently available for execution on the computing resource instance 636, or removing a user interface element from desktop 644 whose selection launches the application.

Entitlement Service:

In some embodiments, an entitlement service (such as entitlement service 624 illustrated in FIG. 6) may be configured to manage licenses and subscriptions for the applications provided by the application fulfillment platform. For example, in some embodiments, the assignment of an application to an end user (or user group) may represent an agreement to provide access to the application to the end user (or user group) for a specific period of time (e.g., for a specific number of months). In some such embodiments, the entitlement service may be configured to manage subscriptions on a monthly basis, to renew subscriptions periodically (e.g., at the end of each month) and/or at the end of their terms (if they are renewed) or to cancel them if they are not renewed. In some embodiments, the entitlement service may be configured to monitor the usage of the applications provided by the application fulfillment platform by end users or user groups, and/or to generate usage reports for end users or IT administrators periodically and/or on request, detailing license usage by the end users or user groups.

In some embodiments, when a "create fulfillment" workflow is invoked, the entitlement service may expose one or more APIs to the IT administrator (e.g., through a service provider system console 616). For example, these APIs may include a "register fulfillment" API, a "create monthly subscription" API, an API to request an end user license to be used for a particular application, or an API to request that a subscription be enrolled in a subscription renewal program (e.g., a monthly renewal program). Similarly, when a "revoke fulfillment" workflow is invoked, the entitlement service may expose one or more other APIs to the IT administrator. For example, these APIs may include a "deregister entitlement" API, a "cancel monthly subscription" API, a "cancel this license entitlement" API, or an API to revoke a particular user from a subscription renewal program (e.g., a monthly renewal program).

Delivery Service

In some embodiments, a delivery service (such as delivery service 626 illustrated in FIG. 6) may be responsible for application lifecycle management, the delivery of applications, and the fulfillment of applications on targeted machines. In some embodiments, after an entitlement service (such as entitlement service 624) has been invoked by a "create fulfillment" workflow to perform operations such as registering a fulfillment, or creating a subscription, license, or entitlement, the "create fulfillment" workflow may request that the delivery service deliver a particular application (e.g., application X) to a particular end user (e.g., user Y) on a particular computing resource instance (e.g., a virtual desktop instance Z), which is the target destination for the application.

In some embodiments, the delivery service 626 may include (e.g., for each end user machine and/or computing resource instance that is registered with fulfillment platform control plane 606) a respective outbound channel (which may be implemented as a queue, such as queue 632 illustrated in FIG. 6). Each of the outbound channels may be configured to receive and store messages for subsequent retrieval by the control plane agent 640 of the corresponding computing resource instance for the end user (e.g., a control plane agent 640 installed on an end user physical computing device, virtualized computing resource instance or virtual desktop instance) to which it is directed. In some embodiments, the control plane agent 640 may be configured to poll the outbound channel (e.g., periodically), to (at some point) extract any messages that are intended for delivery to the corresponding computing resource instance, and/or to perform and/or manage the work indicated in the messages. In some embodiments, when a message is put in a queue 632 that is intended for a particular end user device or computing resource instance, a notification may be sent to the end user device or computing resource instance indicating that there is a message to be retrieved from the queue. The message may include instructions to be performed by the control plane agent 640 installed on the computing resource instance, e.g., as part of a "create fulfillment" workflow to fulfill or install an application on behalf of the end user and/or as part of a "revoke fulfillment" workflow to revoke or uninstall an application from the end user device or computing resource instance.

Note that, in some embodiments, sending a message to enlist the delivery service in performing portions of a "create fulfillment" workflow may or may not imply that the corresponding resources (e.g., fulfilled applications) are assigned to the end user or the end user's computing resource instance 636 at that point. Instead, the instructions may include an indication of the resources that will be needed and instructions for the steps to take to fulfill/install an application or revoke/uninstall an application fulfillment at a later time. For example, the steps may include registering a session with the particular endpoint, going to a specified location (e.g., in an object or file storage system on the application fulfillment platform) to retrieve a particular file (or set of files) for the application, installing the file(s) in a specified order, and then activating the application (e.g., through another service call).

In some embodiments, an inbound channel may expose whatever the messages in the outbound channel indicate should be exposed. For example, the delivery service may expose an API "register session", after which an application delivery agent 638 (or control plane agent 640 thereof) that is installed and is executing on the computing resource instance may call the delivery service with its security credentials. In order to perform a step to fetch a specified binary file or virtualized application package from storage, the agent may ask the delivery service for the destination at which the application binary file or virtualized application packaged for a particular application can be found. The delivery service may return the location, after which the agent may report back to the delivery service that it has retrieved and/or installed the binary file or virtualized application package, and the delivery service may register its acknowledgement of fetching the binary or virtualized application package. In some embodiments, to install a virtualized application package, the agent may be responsible for virtualizing the virtualized application package for execution on the computing resource instance (which may include overlaying file system and/or register information for the virtualized application package on the operating system that is executing on the computing resource instance so that it appears that the application is installed on the operating system). Subsequently the agent may request that they delivery service provide it with an active license with which to activate the application. The agent may subsequently report to the delivery service that it has activated the application and/or that it has completed the act of virtualizing the application (as applicable).

In some embodiments, the delivery service may be configured to keep track of the state of applications and to perform various lifecycle management tasks for the applications. For example, the delivery service may keep track of which applications are executing on which computing resource instances, and the state of those applications on those computing resource instances (e.g., which versions of the applications are installed, whether as binary executables or as virtualized application packages). In some embodiments, this information may be used by the system (e.g., automatically) or by an IT administrator to determine when and if any of the applications should be updated.

Application Data Storage

In some embodiments, as an end user is using an application, executing the application may generate application data e.g., application state data, application templates, and/or scratch data) in addition to (but not to be confused with) artifacts and/or results that are generated by executing the application. For example, in some embodiments, a company or enterprise that is a customer of the service provider may choose to create an application template (e.g., for a productivity application or a line-of-business application) and may request that all of its end users (e.g., employees or members of the same organization) use the same application template when using the application. These templates may be stored as application data on the fulfillment platform control plane 606 (such as in application data storage 634 illustrated in FIG. 6) by the delivery service (such as delivery service 626). Again note that artifacts/results generated by executing the application (e.g., documents, presentation materials or other outputs of the application) may not be stored on the fulfillment platform control plane 606 by the processes implemented on the application fulfillment platform, but may, in some embodiments, be stored elsewhere on the end user system 608 or service provider network 600 by other means. Note also that, in some embodiments, a user's application data (e.g., application state and/or scratch data 152, or application state information or application templates stored in application data storage 634) may remain with an end user even if the end user subsequently executes the application on another physical computing device, virtualized computing resource instance, and/or virtual desktop instance. For example, if an end user installs an application to which the end user is entitled on a different virtualized computing resource instance or a different virtual desktop instance than the one on which the end user previously installed the application, any application data generated for, during, or by the previous installation may be brought along with the new installation and applied when executing the application on the new virtualized computing resource instance or on a different virtual desktop instance.

Identity Broker

In various embodiments, computing resource instances (including virtualized computing resource instances or virtual desktop instances) may be implemented on computing devices that are domain joined to an active directory. In such embodiments, a user may log into a computing resource instance using their active directory. In some embodiments, in order to access service provider services and/or resources, the end user may have to go through an identity access management (IAM) process or protocol implemented by the service provider before gaining access to at least some of the applications and/or services provided by the application fulfillment platforms described herein. For example, an end user may be logged into a particular computing resource instance using their active directory, but the fulfillment platform control plane 606 may only understand roles and/or tokens generated by the IAM process/protocol. Thus, after logging into the computing resource instance, the user may not have the proper credentials to access the applications and/or services provided by the application fulfillment platform.

As described in more detail below, in some embodiments, an identity broker service (such as identity broker 630 illustrated in FIG. 6) may be configured to federate an active directory user in order for the user to gain access to service provider resources. For example, an active directory identifier ticket (e.g., one provided by a domain controller) may be presented to the identity broker service specifying that a principal (user) X wants access to a particular application on machine Y that is connected to domain Z. The identity broker service may communicate with a service provider active directory service (e.g., a domain controller) and/or another device identity service (such as device identity service 622) requesting authentication of the user (X) and/or the user's machine (Y) and the return of a security token that is subsequently usable in accessing service provider resources. As illustrated in the example in FIG. 6, in some embodiments, the application delivery agent 638 installed on an end user's computing resource instance 636 (or a control plane agent 640 thereof) may communicate directly with the identity broker service rather than through proxy service 628.

Proxy Service:

In some embodiments, backend services of an application fulfillment platform (e.g., fulfillment platform control plane services) such as those described above (e.g., a fulfillment service, an entitlement service, a delivery service, and/or an identity broker service) may not be exposed to the public (e.g., to end users). For example, these services may not be exposed to end users in an attempt to avoid exposing them to potential malicious attacks (e.g., denial of service attacks or other types of attacks). Instead, a proxy service (such as proxy service 628 illustrated in FIG. 6) may be exposed to end users, and this proxy service may be configured to validate the identity of an end user who attempts to access the services of the application fulfillment platform and/or to enforce any applicable metering or throttling policies (e.g., limiting access in order avoid denial of service attacks or other types of malicious accesses) for requests received from end users. As illustrated in the example in FIG. 6, in some embodiments, the application delivery agent 638 installed on an end user's computing resource instance 636 (or a control plane agent 640 thereof) may, on behalf of an end user, communicate with the fulfillment service 620, device identity service 622, entitlement service 624, and/or delivery service 626 though proxy service 628. If (or once) an end user's identity has been validated, the proxy service may pass or dispatch requests received from the end user to the appropriate backend service (e.g., a fulfillment service, an entitlement service, or a delivery service) for processing.

In some embodiments, if an application delivery agent (or a control plane agent 640 thereof) installed on an end user's computing resource instance 636 wishes to subscribe to an application (on behalf of the end user), the agent may send a request to the proxy service, which may validate its security token, verify that the user is entitled to access the appropriate backend services (through the end user's computing resource instance), and route the request to the fulfillment service. In response, the fulfillment service may process the request and send a response back to the proxy service. In another example, if an agent installed on an end user's computing resource instances wishes to fetch a message from the outbound channel (e.g., queue 632) for its computing resource instance, the proxy service may present the security token to the queue and, once access to the message is verified, return the message to the agent.

Packaging Service

In some existing systems, to deliver desktop applications to an end user, executable versions of those desktop applications (e.g., application binaries) are physically installed on an end user's physical computing device (whether or not the physical computing device implements a remote computing application to manage a remote computing session (e.g., a virtual desktop session). In these systems, when an underlying virtual desktop instance is rebuilt, all of the applications and application data associated with that virtual desktop instance is lost and the end user has to reinstall all of the applications on the newly rebuilt virtual desktop instance. In some embodiments of the application fulfillment platforms described herein, rather than physically installing desktop applications on the machines of end users or installing application binaries on the computing resources that implement a virtual desktop instance, delivering at least some applications (e.g., desktop applications) may first include transforming them from one form to another. For example, an office productivity application or browser application may be transformed into a virtualized application package, pages of which may be delivered on demand.

In some embodiments, a virtualization packager (such as packaging service 610 illustrated in FIG. 6) may be configured to virtualize the program instructions of an executable application (such as an application binary 612) to create a virtualized application package (such a virtualized application package 614) that includes a sequence of blocks of virtualized program instructions (also referred to herein a pages of virtualized program instructions). These virtualized program instructions specify how the instructions would execute on the system. In some embodiments this application virtualization technology may include a runtime engine (such as runtime engine 642 in FIG. 6) that intercepts all function calls to the operating system of the end user's computing resource instance and executes the virtualized program instructions of the packaged application in an isolated virtual environment (e.g., an isolated container). In other words, the application may behave as if it is running alone in the operating system. In some embodiments, the runtime engine may begin fetching pages of virtualized program instructions (e.g., using demand paging) and may begin executing them before all of the pages have been fetched (e.g., after 5% of the pages, or fewer, have been fetched). In some embodiments, pages that have previously been fetched may be stored locally (e.g., on the end user's machine) in an encrypted cache and subsequently executed (e.g., one or more times). In such embodiments, the performance of the application may be similar to the performance of a native application (e.g., an application binary) that is installed locally on the end user's physical computing device.

In some embodiments, each application (or at least some of the applications) provided by the application fulfillment platforms described herein may be repackaged as a virtual application packaged using a process that is largely automated that does not require any changes to be made to the application or even access to the source code. In some embodiments, in addition to transforming an application into a sequence of blocks of virtualized program instructions, the packaging service may also encrypt the resulting virtualized application package. In some embodiments, the application virtualization described herein may enable applications to run on end users' computers without having to go through the usual install process. Eliminating that installation step and isolating applications from the underlying operating system may enable much more dynamic and flexible application delivery, when compared with classic application installations. For example, the application virtualization described herein may provide, for each application, an isolated container, which may provide flexibility to dynamically move applications and application data across computing resources (including virtualized computing resource instances and/or virtual desktop instances) and instant access to applications. In some embodiments, application updates and/or rollbacks may be applied using the application virtualization described herein with no impact to end users. Note that in some embodiments, the fulfillment platforms described herein may include a commercial virtualization packager and corresponding runtime engine, while in other embodiments, such platforms may include custom virtualization packagers and/or runtime engines.

Administrator Tasks

As previously noted and described in more detail below, in order to manage the delivery of applications to end users, an IT administrator of a business, enterprise, or other organization may be able to perform a variety of different actions through an administrator console of an application fulfillment platform (such as service provider system console 122 in FIG. 1 or service provider system console 616 in FIG. 6), many of which fall into one of the following three broad categories:

1) Building a catalog for the organization, where the catalog is a collection of applications that may include any of the following application types:
    the organization's own line-of-business (e.g., custom) applications
    applications for which the organization has purchased licenses, including enterprise-wide licenses (e.g., applications that may be included in the catalog under a "bring your own license" model)
    applications purchased or leased from the service provider (e.g., applications that were developed by the service provider or that were purchased or leased by the service provider for the benefit of its customers)
2) Assigning particular applications to specific end users and/or user groups in the same organization
3) Generating, obtaining, and/or viewing reports indicating the usage of the applications that are provided through the application fulfillment platform to end users in the same organization As noted above, the systems and methods described herein for implementing an application fulfillment platform may, in various embodiments, allow large enterprises to create and manage catalogs of software applications and computation services, including server applications that execute in a cloud computing environment and desktop applications that execute on physical computing devices, virtualized computing resource instances, and virtual desktop instances. These systems may allow service provider customers (e.g., enterprises) to ingest their own line-of-business applications (e.g., server applications and/or desktop applications) into the catalogs, through which they may be made available for use by their end users. In some embodiments, an IT administrator of a service provider customer may interact with the service provider system through an administrator console to assign and provision applications to various end users and/or to define constraints on the use of those applications.

In one example, a semiconductor manufacturer that is a service provider customer may include in their catalog proprietary applications used in designing and/or fabricating integrated circuit devices (e.g., applications that were designed by, or on behalf of, the company and that are exclusively used by employees of the company, and then only with permission), and delivery of these applications may be managed through an application fulfillment platform such as those described herein. In another example, a company that is a service provider customer may procure large enterprise-wide licenses for commonly used commercial products in order to provide unlimited access to those product to its employees. These applications may be included in a catalog for the company and delivery of these applications may be managed through an application fulfillment platform such as those described herein. In yet another example, a company may purchase or lease short-term licenses to a desktop application or another commonly used commercial application (e.g., licenses to a drawing application for 6 employees for 6 months) from the service provider, include that application in its catalog, and manage delivery of that application to its employees through an application fulfillment platform such as those described herein. In other words, a company that wishes to use one or more applications for software trials, short-term needs or low-volume needs may obtain access to those applications through an "applications on-demand" model that is managed through the application fulfillment platform (thus, taking advantage of the more favorable terms that may be received by the service provider as a higher volume customer of the application vendor).

As noted above, in some embodiments, applications (e.g., individual applications and/or collections of applications) may be assigned by an IT administrator to individual users and/or user groups in an active directory to allow access to those applications. For example, an active directory of an enterprise (e.g., a company that is a customer of a service provider) may sit at the center of its resource management processes. Resources (e.g., users, computers, printers, or other corporate resources, each of which may have its own identifier) may be connected to the active directory, and an IT administrator at the company may give users access to particular ones of the resources. In some embodiments, an IT administrator may create a cloud-based active directory for the enterprise. In other embodiments, connections may be made from a virtual desktop instance to an active directory (or domain controller) on an enterprise computer system.

In some embodiments, the IT administrator may, through an administrator console (e.g., a service provider system console) assign particular applications to specified users (and/or user groups) by selecting one or more users and/or user groups in its active directory from a display of the active directory (or through another interface into the active directory). For example, the IT admin may be able to assign applications (e.g., one or more desktop applications, such as an office productivity suite, a data analysis application and/or a browser application) to the selected users and/or user groups (e.g., groups of users that are defined in the active directory as the "development team" or "legal team"). In another example, an IT administrator may wish to provision a desktop application (e.g., a word processing application) to user1, user2, and group1 in an active directory. The actions taken in order to carry out that fulfillment may depend on the type of application. In this example, since the application is a desktop application that is available through an application fulfillment platform, the IT administrator may (e.g., through an administrator console) assign the desktop application to user1, user2, and group1, and fulfilling the intended state for user1, user2, and group1 may include invoking various ones of the services illustrated in FIG. 6 and described above.

In some embodiments, the IT administrator may, through an administrator console (e.g., a service provider system console) also be able to apply various constraints on the use of selected applications by the users or user groups to which the applications are assigned (either individually, or collectively). For example, in various embodiments, the constraints that may be applied by the IT administrator may be broadly categorized as being one of the following four types: environmental constraints (which may restrict the region in which an application can be provisioned), input parameter constraints (which may restrict the set of valid values for input parameters that can be entered when an application is provisioned or updated), quotas (which may allow the administrator to control the number of concurrent deployments of a given application) and billing constraints (which may allow the administrator to control spending limits on an application by application basis).

In one example, the collection of three applications described above may be assigned to three active directory users, one of which may represent a user group. In this example, constraints may be set indicating that user1 should use a particular version of application1 (e.g., an office productivity suite) and should not have access to any updated versions of application1; that user2 should use a particular version of application2 (e.g., a data analysis application) that is compatible with a particular operating system revision and should not have access to any updated versions of application2; and that user3 (which may represent a group of active directory users) may have access to application3 (e.g., a browser application) that should always be kept current (e.g., with updates applied automatically, when available).

As noted above, in some embodiments, the IT administrator may, through an administrator console (e.g., a service provider system console) be able to generate, obtain, and/or view reports indicating the usage of the applications that are provided through the service to their end users. For example, these reports may indicate how many (and/or which) users are using each application, how many (and/or which) users are using each version (e.g., the latest version or an outdated version) of a particular application, the duration for which each application is used by one or more users, and/or other usage information. The information in these reports may be used by the IT administrator to determine which of several available licensing models (e.g., on-demand subscriptions using licenses obtained by the service provider, enterprise licenses obtained directly from the software vendors but managed by the service provider, etc.) may be most suitable for the software being used by their organization.

In some embodiments, launching a virtual desktop instance may include making selected applications available to end users through a desktop application management module interface, according to the constraints and configuration parameter settings for the selected applications and users. In some cases, this may include installing any required applications and/or making certain applications (e.g., those applications that are assigned to a particular end user or those an end user is allowed to know about) visible and/or selectable through a desktop application management module interface or (once they are installed on an end user machine or in a virtual desktop instance) through an icon, shortcut, menu element, or other user interface mechanism or element thereof that was created on the desktop for the application and whose selection launches the application.

Again note that, in some embodiments and/or for some applications, "installing" a required or optional application may not include installing the application itself (i.e., an unpackaged application binary) on an end user's physical computing device, virtualized computing resource instance or virtual desktop instance, but may involve delivering some or all of the pages of program instructions of a virtualized application (e.g., using demand paging) to the end user's computing resource instance for execution by a runtime engine that is installed in the end user's computing resource instance.

As previously noted, it may be difficult for a large enterprise (e.g., one that includes a large number of end users who wish to have access to many applications on many different machines) to keep all of the applications its employees may wish to use (e.g., 50 or 60 applications per user) up to date using the traditional approach of physically installing applications on each machine. In various embodiments, the systems and methods described herein may allow enterprise customers to fulfill applications for the use of their end users through a different paradigm, i.e., one that is based on application virtualization. In such embodiments, each application (or version thereof) may be virtualized and packaged to create a virtualized application package (e.g., in an isolated container). These virtualized application packages may not be physically installed on an end user's machine, but instead may be executed on service provider resources (at runtime) by an agent that is installed on (and is executing on) a virtual desktop instance and that appears to be executing on the end user's machine.

As illustrated in FIG. 6 and described above, in some embodiments, the application delivery agent 638 may include a control plane agent (such as control plane agent 640) that interacts with the fulfillment platform control plane and the services implemented on the control plane, and another component (a runtime engine, such as runtime agent 642) that executes the virtualized program instructions of virtualized application packages on behalf of the end user. In some embodiments, the control plane agent 640 may communicate with various control plane components and services (e.g., an identity broker service and/or outbound channel queue) directly or through a proxy service of the fulfillment platform control plane. For example, in some embodiments, when an end user's machine boots up, its control plane agent may communicate with the identity broker in order to register the machine with the fulfillment platform control plane. In this example, the control plane agent may present a credential (e.g., a machine-level security token or ticket) for a machine Y and may request that the identity broker authenticate and register machine Y with the fulfillment platform control plane. The identity broker may validate the machine, which may include determining whether the owner of the machine has a valid account (e.g., determining whether the account ID associated with the machine is a valid account ID for an enterprise that is a customer of the service provider). If the machine is validated, the identity broker may register the machine with the fulfillment platform control plane.

In some embodiments, once an end user's machine has been registered with the fulfillment platform control plane, when the end user logs onto this machine, the control plane agent on the machine may present another type of ticket (e.g., a user-level ticket, such as a user sign-in ticket that was obtained from a domain controller) for validation. For example, the user sign-in ticket may indicate that a user X logged onto machine Y on domain Z, and if the identity broker validates the ticket, it may return a security token that the end user can use to access other fulfillment platform control plane services through the proxy service.

In some embodiments of the fulfillment platforms described herein, the runtime engine portion of the agent on which virtualized applications can execute (such as runtime engine 642 illustrated in FIG. 6) may be specific to the virtualization packager (such as packaging service 610) that is used to transform them into virtualized applications. For example, the runtime engine and virtualization packager may share common instruction formats, file formats, file structures, and/or other features that enable the interpretation of the virtualized applications by the runtime engine.

In some embodiments, each of the virtualized applications that are packaged by the packager may be isolated into a container, such that the contents of each container is executed in isolation by the runtime engine and the individual applications do not know anything about each other. This isolation may allow multiple generations and/or versions of an application to execute on the same physical machine. In various embodiments, and depending on various settings (e.g., off-line or on-line only), the page blocks that make up a virtualized application may or may not be stored locally on the end user's machine during (or following) their execution by the runtime engine.

In some embodiments, once an end user logs into the desktop application management module, their applications (e.g., any application assigned to the end user) may be available and ready to use. In some embodiments, the end user may access their application just like they access any other desktop applications (e.g., through a start menu or a desktop icon or shortcut). Through the desktop application management module, the end user may be able to select one or more of the following options:

View information about applications that were made available to the end user by their IT administrator
    Subscribe to optional applications
    Remove optional applications
    Request access to additional applications that are listed in the full application catalog, which may include applications sourced by the service provider and/or by third parties (if enabled by the IT administrator)
    Back up their applications and configurations (e.g., automatically)
    Receive notification about applications and application updates In some embodiments, if the IT administrator has designated an application as "required" for a given end user (i.e., having an installation type of "required"), it will be installed on an end user's virtual desktop instance by default, and cannot be removed. However, if the IT administrator has designated an application's installation type as "optional", it may only be installed on the end user's virtual desktop instance if the end users choose to subscribe to the application. As noted above, if the IT administrator has enabled the full application catalog as viewable for a given end user, user group, catalog, or portfolio, the end user may be able to discover additional applications that are sourced by the service provider and/or third parties (e.g., applications for which the installation type is "request access"), and select a "request application" option, which may automatically submit a request to the IT administrator for approval to access the selected application.

In some embodiments, when a software vendor provides an update to the application fulfillment platform (or to the service provider) the service provider may (e.g., through the application fulfillment platform) publish the update and make it available to end users (e.g., through the desktop application management module. In some embodiments, the IT administrator may be able to control the maintenance window in which application updates are applied to the computing resource instances of its end users. In such embodiments, if an end user is using an application that is targeted for an update during the maintenance window, the end user will not experience any interruption, because the update will occur in the background. However, the next time the end user launches the application, the update will be applied. In some embodiments, there may be a notification engine within the desktop application management module that is configured to inform end users of upcoming application updates and newly available features. The notification engine may be accessed through the desktop application management module graphical user interface (e.g., using the "notifications" tab shown in FIGS. 7A and 7B), or using other mechanisms, in different embodiments. For example, if the IT administrator has made new optional applications available for end users to subscribe to, they may be notified through the desktop application management module. In some embodiments, the application fulfillment platform may preserve application state by automatically backing up applications and application data for subsequent copy or restore operations. For example, if the virtual desktop instance is rebuilt, the applications and application data may be automatically restored on the virtual desktop instance. Similarly, upon rebooting an end user's machine after a failure, the virtual desktop instance may automatically be rebuilt, and the applications and application data may be automatically restored.

In one example, an end user may (through the desktop application management module) select an option to subscribe to a particular listed application. In response, a subscribe request may be sent (e.g., by a control plane agent, such as control plane agent 640 illustrated in FIG. 6) to a proxy service (such as proxy service 628) using the user's security credentials, and the proxy service may route the request to a fulfillment service (such as fulfillment service 620). In this example, the subscription request may indicate that user X on machine Y connected to domain Z requests access to the selected application. The fulfillment service may verify whether the end user is entitled to use the selected application and, if so, may initiate the execution of a "create fulfillment" workflow and send a message to that effect to the outbound channel for the target end user machine or virtual desktop instance (e.g., a queue such as queue 632 in FIG. 6).

On the end user's machine, the control plane agent may (e.g., after communicating the subscription request to the proxy service) poll the outbound channel (queue) looking for messages that are directed to the end user (or to the end user's machine). In this example, since the subscription request included an indication of the end user's machine, the fulfillment service, having a respective outbound channel (queue) for each end user machine and/or virtual desktop instance that is registered with the application fulfillment platform, knows into which of multiple outbound channels (queues) the message should be placed, and a corresponding control plane agent (such as control plane agent 640) may retrieve the message from that queue. Once the message has been retrieved, the control plane agent may be configured to carry out the steps that are indicated in the message for fulfilling the requested application subscription. For example, the control plane agent may be configured to work through a sequence of steps that include registering a session, virtualizing the selected application, generating an icon or shortcut for the virtualized application and placing it on the end user's machine (e.g., on the desktop or on the virtual desktop) and/or adding the virtualized application to a start menu or other interface mechanism, among other actions.

In some embodiments, once the selected application has been virtualized and an icon, shortcut, menu item, or other user interface mechanism has been provided on the end user's machine (e.g., on the desktop or on the virtual desktop), it may appear to the end user as if the selected application is physically installed on the end user's machine, even though the binary for the selected application is not, in fact, installed on the end user's machine. In this example, when the end user invokes the selected application (e.g., by selecting the icon, shortcut, menu element, or other user interface mechanism or element thereof for the selected application), a runtime engine component of the agent on the end user's machine (such as runtime engine 642) may be launched to execute the virtualized application. In some embodiments, the runtime engine component may be implemented as a driver-level engine. In some embodiments, the runtime engine component may observe that the user is launching a virtualized application and may intercept the launch. The runtime engine component may use its device-level (i.e., machine-level) security token to communicate to a delivery service of the fulfillment platform control plane (such as delivery service 626) that machine Y is starting to deliver the sequence of files or pages of virtualized program instructions that make up the selected virtualized application and to ask the delivery service for instructions. The delivery service may then (e.g., through messages placed in the outbound channel for machine Y) provide instructions to the control plane agent to start making the files or pages of virtualized program instructions available for execution. As the end user begins to use the selected application (i.e., at runtime), the files or pages of virtualized program instructions that make up the selected virtualized application may be made available for execution on the runtime engine component of the agent on the end user's machine. In some embodiments, once the end user is finished using the selected application, the files or pages of virtualized program instructions that make up the selected virtualized application may be cleaned up (e.g., remnants of the files or pages of virtualized program instructions may be removed from local memory), but any application data that was generated for, during, or by the execution of the virtualized application (other than artifacts/results of its execution) may be persisted (e.g., in an application data storage component of the fulfillment platform control plane) for use in a subsequent execution of the selected application by the end user. In other embodiments, the files or pages of virtualized program instructions may be stored locally (e.g., in an encrypted cache from which they may subsequently be executed (e.g., if the end user begins to use application again).

In some embodiments, a fulfillment service (such as fulfillment service 620) may provide APIs for service calls, including service calls (made through the administration console) to create or update an application deployment (i.e., a service call that includes an indication of an intended state for an application fulfillment). In response to one of these calls, the fulfillment service may be configured to insert deployment metadata into a deployments table with a "pending" status. If successful, the fulfillment service may insert the deployment request into a queue of such requests. Subsequently, the deployment request may be retrieved from the queue, and a deployment workflow may be launched to process the request. The deployment workflow may include determining the end users and user groups to which an application being deployed is currently assigned (if any), comparing it with the request, and editing a stored mapping between users and the application if necessary; creating a fulfillment request for deployment of the application; and adding the fulfillment request to a queue of pending fulfillment requests (e.g., a queue of pending requests to fulfill an intended state for a given user, such as queue 632). In some embodiments, a control plane agent 640 of a virtual desktop instance that is provisioned for the use of the given user (or a long polling thread thereof) may be configured to poll a queue 632 of pending fulfillment requests for the given user and to perform the requested tasks in those requests.

As previously noted, in some embodiments, the systems described herein for providing on-demand delivery of desktop applications to virtual desktop instances may implement multiple authentication mechanisms. For example, in some embodiments, end users may be registered and their identities authenticated separately from their computing resource instances (e.g., their physical devices, or virtualized computing resource instances or virtual desktop instances that are provisioned on their behalf), after which the platform may register the association between the end users and their computing resources instances. Note that in some embodiments, an application delivery agent such as those described herein may be installed on a virtual desktop instance. In such embodiments, the agent is not executing on the end user's client device (e.g., their physical computing device, such as a desktop computer, laptop computer, smart phone, or tablet computing device) but is executing on a virtual desktop instance that is implement on a virtualized computing resource instance running (e.g., in a data center) on a service provider network. In some embodiments, an application delivery agent (which is a client-side component of the application delivery platforms described herein) and/or a client-side component of the virtual desktop instance described herein may be downloaded through a product discovery portal implemented by the service provider, or may be available through a portal that provides access to products specifically configured for use on a particular physical computing device or for use with a particular operating system running on a physical or virtual a computing resource instance. After downloading these clients, an end user may gain access to the virtual desktop instance and/or the application fulfillment platform services described herein by first entering their domain credential to get connected to their specific virtual desktop instance that runs on service provider resources in the cloud (e.g., a virtualized computing resource instance that has modified to mimic the features of the desktop or over which a virtual desktop instance is built).

In some embodiments, there may be multiple authentication processes that must take place before an end user can access the control plane services or virtualized applications provided by the fulfillment platform. For example, one authentication process (e.g., a device-level authentication) may result in the identity broker service described above providing a unique device identifier and a device-level security token that allows the control plane agent executing on an end user device (e.g., the end user's physical computing device or virtualized computing resource instance) to access to the outbound channel (queue) and proxy service of the fulfillment platform control plane. A second authentication process (e.g., a user-level authentication) may result in the identity broker service providing a unique user identifier a user-level security token that allows the end user to access the proxy service of the fulfillment platform control plane only. In some embodiments, separating these two authentication processes may allow some end users to have dedicated devices (e.g., physical computing devices or virtual desktop instances that are allocated from a pool of such devices and on which they are the sole user) and/or may allow multiple end users (or terminals) to use the same device (e.g., to share a single physical computing device or a single virtual desktop instance). For example, a device-level authentication may be valid when the control plane agent needs to communicate with the fulfillment platform control plane on behalf of any and all end users who are logged into the device. However, the end users themselves may only be able to access the resources for which they have permissions through their own user-level authentications.

In some embodiments, two services (the identity broker service and the device identity service described briefly above) may be responsible for accepting device credential and/or an end user's domain credentials (e.g., active directory credentials obtained from a domain controller), validating them, and passing them to a security token service (such as ID broker service 630 illustrated in FIG. 6), which returns a temporary security token to be used to access control plane services. In some embodiments, the proxy service described herein may be a secure outbound gateway that only accepts the security tokens generated by these two control plane services, and upon validation, the proxy service may allow the application delivery agent access to communicate with (e.g., to send services requests or inquiries to) various control plane services (e.g., the fulfillment service, entitlement service, delivery service described herein), as well as any storage services that store information related to (or used in) providing on-demand delivery of desktop applications to virtual desktop instances on behalf of the end user, agent, or desktop application management module. In some embodiments, the systems described herein may support a single sign-on model.

In some embodiments, the purpose of the identity service of the application fulfillment control plane (such as identity broker service 630 illustrated in FIG. 6) may be to provide an authentication mechanism between the desktop application management module, the local application delivery agent running on the end user's device and the rest of the services running on the application fulfillment platform control plane, according to the defined security model. The service may expose two endpoints, each of which will allow authentication of an end user and their device using the end user's credentials and device identification and will allow renewal of the security token, which will be used to access services running on the control plane. This service may also be responsible for storing user/device identity information and serving that data to various internal services.

Note that in embodiments in which the security token is a temporary token that expires after a pre-determined time period (e.g., in embodiments in which it expires after a few hours or after a life span of up to 36 hours), when it expires (or is about to expire) the application delivery agent may be configured to call a method to renew the security token. In other embodiments, the security tokens generated by the control plane for end user devices (e.g., physical computing devices, virtualized computing resource instances, or virtual desktop instances) may not be temporary tokens. For example, in some embodiments, these security tokens may not expire on their own at all (e.g., they may have to be explicitly deleted or revoked by the agent or by a control plane service) or they may have configurable expiration periods (e.g., expiration periods that can be selected by the IT admin for their organization).

As described herein, the control plane may also generate a security token for the end user, and may pass the token back to the active directory identifier for this user (the security identifier for this user in the active directory). In some embodiments, the security identifier may also be passed back to the application delivery agent in order to check, on the agent side, to see if it still matches what the agent thinks the user identity is. If not, then the control plane may reject the requests received from the virtual desktop instance or the virtual desktop instance may reject commands that are received from the control plane that include with this non-matching security identifier. As with the security tokens generated for devices, a security token generated for an end user may be a temporary token that expires after a pre-determined time period, As in the example above, if the security token for the user expires, the application delivery agent may be configured to re-authenticate this user and to obtain a new security token on behalf of the user). In other embodiments, the security tokens generated by the control plane for end users may not be temporary tokens. For example, in some embodiments, these security tokens may not expire on their own at all (e.g., they may have to be explicitly deleted or revoked by the agent or by a control plane service) or they may have configurable expiration periods (e.g., expiration periods that can be selected by the IT admin for their organization).

In various embodiments, the application delivery agents described herein may be configured to do some or all of the following:
  Communicate with the application fulfillment platform control plane (polling only).
  Manage the application virtualization layer.
  Manage application licenses.
  Manage the lifecycle of virtualized applications.
  Manage registration and authentication of end users and devices.
  Support automatic updates (including updates of itself).

In some embodiments, the systems described herein may include a file system filter driver or some other listening mechanism that is configured to intercept particular write operations for a virtualized application that is overlaid on the operating system. For example, in some embodiments of the systems described herein, the application virtualization technology used to package desktop applications for delivery to an end user's computing resource instance (whether it is a physical computing device or a virtualized computing resource instance on which a virtual desktop instance is implemented) may support a construct (e.g., a file system filter driver construct) through which write operations to a particular namespace may be detected and intercepted. For example, in some embodiments, all desktop applications that are delivered by an application fulfillment platform (such as those described herein) as virtualized application packages may be registered with a particular namespace (e.g., a namespace corresponding to the service provider). The application delivery agents installed on end users' computing resource instances may recognize that applications registered using this namespace are virtualized applications, and may be configured to intercept write operations associated with this namespace (e.g., write operations in which application state data and/or scratch data are written out) and to redirect them to pre-defined target locations (e.g., locations that may or may not be on the same physical drive or virtual storage volume as their original target locations). The application delivery agent would thus know the location of the application state data and/or scratch data, allowing the agent to snapshot the data during execution of the application and to subsequently restore it (e.g., to the same location) following a reinstallation of the application. Note that, from the perspective of the operating system and/or application, it may appear as if these write operations are performed as in the original code.

As described above, in some embodiments, the application delivery agent installed on a virtual desktop instance may need to communicate with the application fulfillment control plane outside of a user context, e.g., to send metrics, access delivery resources, get license information, etc. For example, it may be desirable for the application delivery agent (rather than an end user) to manage the work to install, uninstall, update, and/or reinstall applications on the virtual desktop instance (especially when there may be multiple end users sharing a single virtual desktop instance). In some embodiments, when a virtual desktop instance is launched, the control plane services may need to know that this "device" (e.g., the virtual desktop instance) now exists (e.g., it may need to be registered with the control plane by the application delivery agent), but in order to trust this device, it must first be authenticated. In addition, once the device has been authenticated, the control plane services (together with the application delivery agent) may authenticate the user and then may associate the user with this device. In some embodiments, after the end user has been authenticated for the first time, the application delivery agent may be given some secret that it can use to obtain temporary credentials (e.g., a temporary security token) to access various control plane services later on.

In some embodiments the sequence of operations that may take place when a desktop application management module (such as those described herein) is started up may include:
- An end user logging into the desktop application management module (using their domain credentials)
- The application delivery agent obtaining a device-level ticket from a domain controller
- The application delivery agent registering the device using the device-level ticket and a device identifier
- The application delivery agent obtaining a security token for the device, one or more refresh tokens, and a secret key
- The application delivery agent storing these security credentials locally (on the virtual desktop instance), and returning the security token for the device to the desktop application management module In some embodiments, the following APIs may be accessed by the application delivery agent without the need to present a security token:
- Authenticate (to authenticate a user or device)
- RenewUser
- RenewDevice In some embodiments, the following APIs may be accessed by the end user through the desktop application management module using the security token for the end user:
- GetCatalog
- GetPortfolioApps
- GetMyApps
- GetMyDevices
- Subscribe
- Unsubscribe
- RequestAccess
- DescribeFulfillmentStatus In some embodiments, the following APIs may be accessed by the application delivery agent using the security token for the device/agent:
- SendMetrics
- PollQueueServiceMessages
- DeliveryAck
- GetPages
- GetLicense
- SyncAppData Note that, in some embodiments, as soon as the application delivery agent is installed and the machine is domain joined, the application delivery agent may be automatically registered with the control plane. At that point, the agent (and later the end user) may have the capability of monitoring health metrics, logging state information, and/or receiving commands from the control plane. In some embodiments, once the application delivery agent is running, it may be configured to participate in a heartbeat mechanism/process with the control plane such that the control plane will know that the device is alive (or that at some point later is it no longer active) and so that the control plane knows about this device and this end user.

Figure 7:
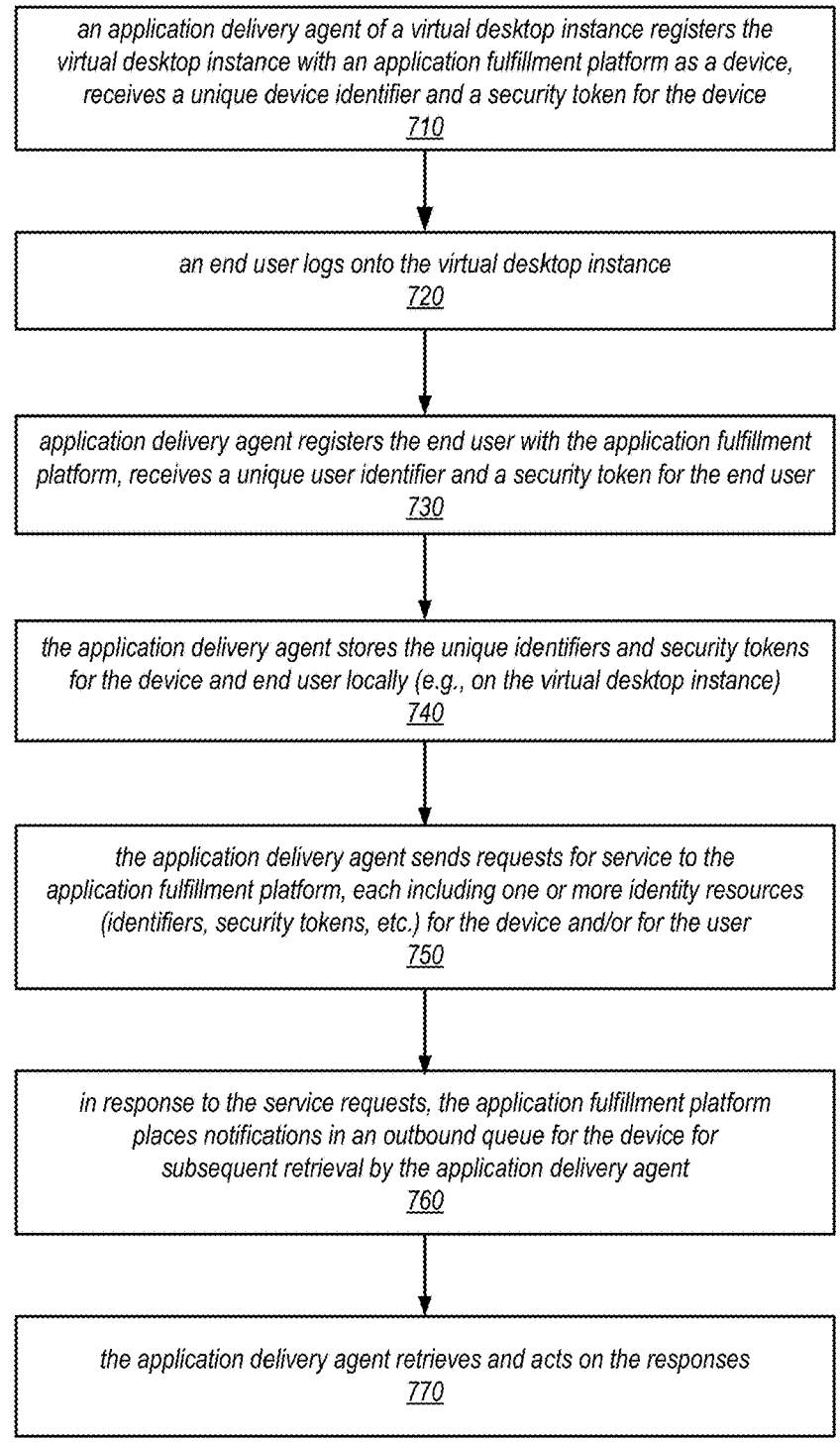
FIG. 7 is a flow diagram illustrating one embodiment of a method for an application delivery agent installed on a virtual desktop instance to interact with an application fulfillment platform.

One embodiment of a method for an application delivery agent installed on a virtual desktop instance to interact with an application fulfillment platform is illustrated by the flow diagram in FIG. 7. As illustrated at 710, in this example, the method may include an application delivery agent that is installed on a virtual desktop instance registering the virtual desktop instance with an application fulfillment platform as a device, and receiving a unique device identifier and a security token for the device. In some embodiments, the agent may also receive one or more refresh tokens and/or a secret key for the device as part of the registration process. The method may include an end user logging onto the virtual desktop instance (as in 720), after which the application delivery agent may register the end user with the application fulfillment platform, and may receive a unique user identifier and a security token for the end user, as in 730.

As illustrated in this example, the method may include the application delivery agent storing the unique identifiers and security tokens for the device and end user locally (e.g., on the virtual desktop instance), as in 740. For example, the application delivery agent may encrypt these identity resources and/or securely store them in a manner that prevents them from being discovered or used by unauthorized users or processes. The method may also include the application delivery agent sending one or more requests for service to the application fulfillment platform, each of which may include one or more identity resources (e.g., unique identifiers or security tokens) for the device and/or for the user, as in 750. In response to receiving the service requests, the method may include the application fulfillment platform placing one or more notifications (messages) in an outbound queue for the device for subsequent retrieval by the application delivery agent, as in 760. The method may also include the application delivery agent retrieving the notifications and acting on the responses included in them, as in 770. Note that, for some types of messages (e.g., various synchronous messages), a response may be returned immediately or relatively soon (e.g., either directly to the requestor or by placing them in the queue) and the control plane agent may wait for the response before proceeding (which may include repeatedly polling the queue while waiting for the response). For other types of messages (e.g., various asynchronous messages, such as requests to subscribe or unsubscribe to an application), the control plane agent may not wait for a response, but may rely on the receipt of a subsequent notification indicating that the response has been posted to the queue.

As noted above, in some embodiments, the identity resources generated by the application fulfillment platform (e.g., unique identifiers or security tokens for end users and their devices) may be stored by the application delivery agent (securely) on the end user's device (e.g., the end user's physical computing device, virtualized computing resource instance, or virtual desktop instance). In some embodiments, the application delivery agent may be configured to encrypt and store these identity resources in such a way that this information is only accessible by users with administrator permissions within the context of the specific computing resource instance. For example, in some embodiments, only the application delivery agent may have access to the security tokens for an end user and the end user's device (i.e., the end user may have no direct access to these security tokens).

In some embodiments, a data protection API may be used to encrypt the unique device identifier that was generated by the application fulfillment platform (or by an identity broker service thereof) and then to encrypt the security token for the device. This encrypted blob (made up of the encrypted identity resources) may be stored in a binary file, and this binary file may be stored in the home directory of a local system account (on the end user's device). In this location, the binary file may not be accessible to a normal user (such as an end user in a service provider customer organization), but only to a user or process with administrator privileges (e.g., the application delivery agent). The data protection API may support different modes. In some embodiments, the identity resources for the end user's device may be encrypted using a machine mode. In this case, if the resulting encrypted blob is taken to another machine, the other machine cannot decrypt it. However, in this mode, any user on the machine on which the blob was encrypted may be able to decrypt it. Therefore, a second entropy (e.g., a password) may be introduced. In this example, rather than storing the password, it may be generated at runtime using a chosen attribute of the device (or its operating system) that serves as a hardware fingerprint (e.g., an attribute that is likely to create the most unique result). In this example, as long as the hardware and operating system do not change, this password may be regenerated if the encryption process is called again.

In some embodiments, the machine mode of the data protection API may be used to encrypt the user identity resource, as well, so that its encrypted blob cannot be used on another machine. In this case, however, a different second entropy may be introduced for each end user (e.g., a respective second entropy may be generated randomly the first time it is needed). In some embodiments, this second entropy may be stored using the data protection API user mode. This may guarantee that one user cannot decrypt the identity resource for another user on the same machine. In this example, when users (or the application delivery agent acting on their behalf) ask the identity broker service to give them their user identity, the user (or agent) may pass the second entropy to the service.

As noted above, the security tokens generated by the control plane for the end user and/or the computing resource instance (e.g., virtual desktop instance) may eventually expire. In some embodiments, the system may employ an automatic token renew process, in which the following steps may be used to obtain a new security token without requiring the end user to re-enter their credentials:

1. The desktop application management module or the application delivery agent may detect that the security token has expired (or is expiring)
2. The agent may initiate the renewal of the security token with the identity service, passing it the expired (or expiring) security token, a refresh token and an access token that were retrieved from a local protected data store.
3. The identity service may validate the user and the device and determine whether the tokens match the ones stored on the service provider resources.
4. The identity service may call a method to generate or obtain a new security token and return it to the agent.

In some embodiments, when a computing resource instance (or virtual desktop instance) is booted up, this device can be authenticated without the end user being logged in. In such embodiments, once an application delivery agent has been installed on the computing resource instance and booted up (and its identity has been authenticated), if there are pending tasks to be performed that do not require the end user to be logged in, the application delivery agent may be configured to retrieve them from a queue on the application fulfillment platform and to handle them (i.e., to take appropriate action). For example, if the IT administrator of the organization to which the end user belongs has marked any applications as required applications, these application may be pre-delivered by the agent to the virtual desktop instance before any user logs into the virtual desktop instance. In this example, when the user logs in, these applications may be available immediately (where normally it might have taken several minutes to prepare a virtualized app for use). In another example, if there were pending tasks in a queue for a virtual desktop instance that had not been retrieved or completed when the virtual desktop instance was rebuilt, the application delivery agent may be configured to check the queue for these tasks and to retrieve and complete them even before the end user has logged in. In yet another example, the application delivery agent may retrieve one or more messages from the queue indicating a clean-up a task to be performed (e.g., deleting applications that have not been approved for installation or for which an entitlement has been revoked, or removing any application state, scratch data, and/or artifacts thereof for applications that have been uninstalled or whose licenses have expired and were not renewed).

Figure 8:
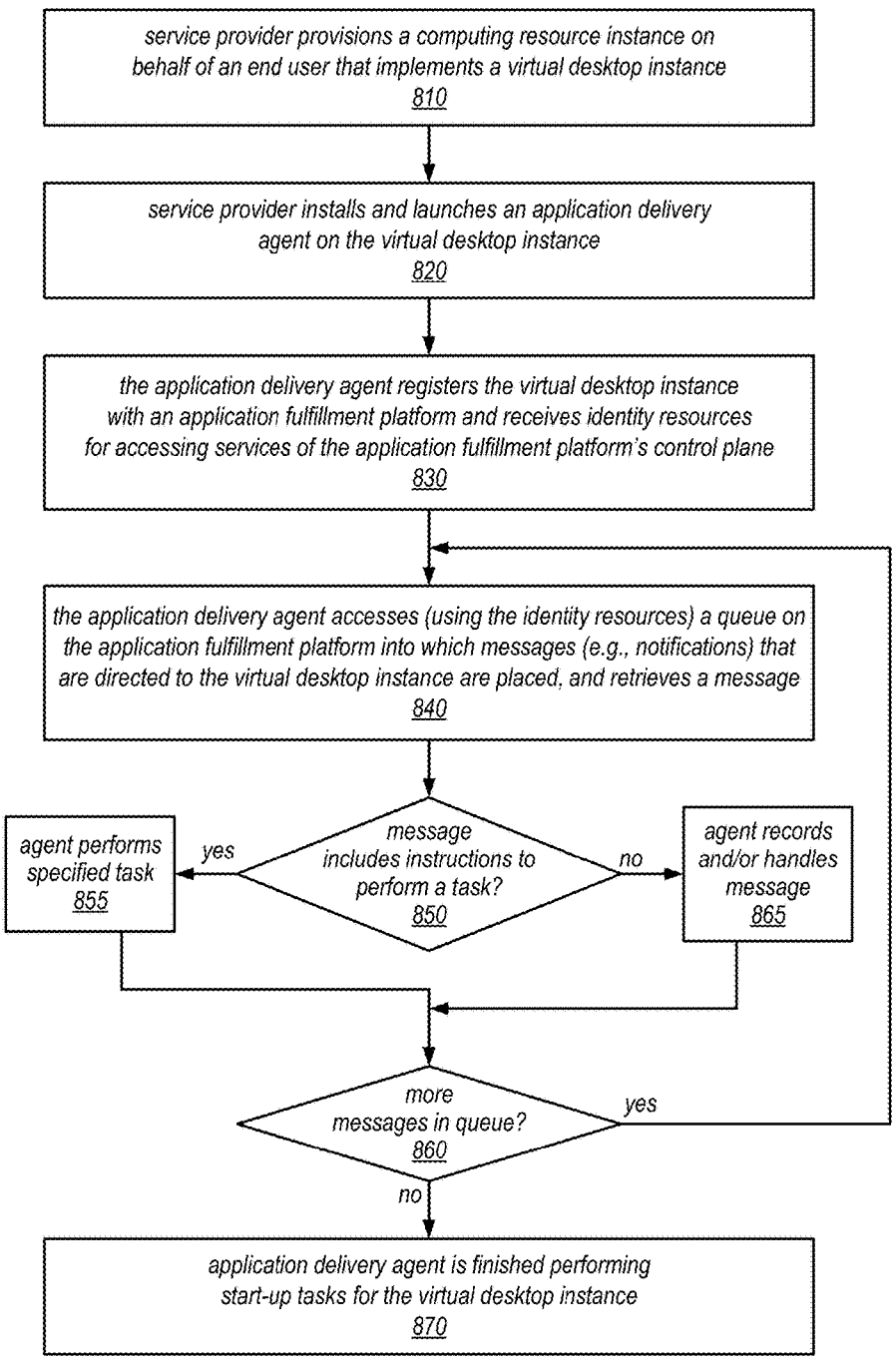
FIG. 8 is a flow diagram illustrating one embodiment of a method for an application delivery agent to participate in the configuration of a computing resources instance.

One embodiment of a method for an application delivery agent to participate in the configuration of a computing resources instance is illustrated by the flow diagram in FIG. 8. As illustrated at 810, in this example, the method may include a service provider provisioning a computing resource instance on behalf of an end user, or more specifically, a computing resource instance that implements a virtual desktop instance. In some cases this may be a first (original) boot up for this particular computing resource instance and/or virtual desktop instance, while in other cases this particular computing resource instance may be provisioned as part of a rebuilding operation for the computing resource instance or virtual desktop instance following a machine failure, the end user changing machines, or the system or end user explicitly initiating the rebuilding of the virtual desktop instance. The method may also include the service provider installing and launching an application delivery agent on the virtual desktop instance, as in 820.

As illustrated in this example, the method may include the application delivery agent (e.g., through a proxy service of the application fulfillment platform) registering the virtual desktop instance with an application fulfillment platform and receiving one or more identity resources (e.g., a unique identifier and/or security token) for accessing services of the application fulfillment platform's control plane, as in 830.

Note that, in some embodiments, this may include requesting an active directory identifier (which may not be returned immediately) and (if necessary) repeating that request until such an identifier is returned. The method may also include the application delivery agent (or a thread thereof) accessing (using those identity resources) a queue on the application fulfillment platform into which messages (e.g., notifications) that are directed to the virtual desktop instance are placed, and retrieving a message from the queue, as in 840. In various embodiments, the message may specify that one or more desktop applications should be install on the virtual desktop instance, or may include some other indication of the intended installation state for applications on the virtual desktop instance. For example, the method may include a list of applications that have been marked (e.g., by an IT administrator of a customer organization) with their installation types (e.g., "required", "optional", or "request access"), in some embodiments.

As illustrated in this example, if the message includes instructions for the application delivery agent to perform a task, shown as the positive exit from 850, the method may include the agent performing the specified task, as in 855. However, if the message does not include instructions for the application delivery agent to perform a task, shown as the negative exit from 850, the method may include the agent recording and/or otherwise handling the message, as in 865. For example, in various embodiments, the message may indicate an intended installation state for one or more applications, may indicate the completion of a task, or may acknowledge that a message has been received by the application fulfillment platform (or one of the control plane services thereof).

As illustrated in this example, regardless of the content of the message, the method may include the application delivery agent continuing to access the queue and to retrieve messages that are directed to the virtual desktop on which it is installed until or unless there are no additional messages in the queue, at which point the application delivery agent may be finished performing start-up tasks for the virtual desktop instance. This is illustrated in FIG. 8 by the paths from 855 and 865 to 860, by the feedback from the positive exit of 860 to 840, and by the feedback from the negative exit of 860 to 870. As described in more detail herein, in some embodiments, messages other than start-up instructions for the virtual desktop instance may be placed in the queue by various control plane resources before or after the application delivery agent has had a chance to retrieve all of the start-up messages that may be placed in the queue for a new (or newly rebuilt) virtual desktop instance, and the agent may continue to retrieve those messages and take appropriate action(s).

In some embodiments, the application delivery agent installed on a computing resource instance (e.g., a virtual desktop instance) may submit service requests to the control plane on behalf of an end user or on its own behalf (e.g., requests to subscribe to a particular desktop application, unsubscribe from a particular desktop application, update a particular desktop application, or reinstall a particular desktop application). For example, if an application delivery agent (or a control plane agent thereof) installed on an end user's computing resource instance wishes to subscribe to an application (on behalf of the end user), the agent may send a request to the proxy service, which may validate its security token, verify that the user is entitled to access the appropriate backend services (through the end user's computing resource instance), and route the request to the fulfillment service. In response, the fulfillment service may process the request and send a response back to the proxy service. Note that the end users themselves may only be able to access the resources for which they have permissions through their own user-level authentications. In another example, if an update is available for an application that is already installed on the end user's computing resource instance is available, and if the end user wishes to receive the update, the application delivery agent (or a control plane agent thereof) installed on an end user's computing resource instance may submit a request to update the application to the proxy service, which may validate its security token, verify that the user is entitled to update the application, and route the request to the fulfillment service. In response, the fulfillment service may process the request and send a response back to the proxy service, including instructions for replacing a locally installed virtualized application package for the application with a new version of a virtualized application package for the application, or instructions for modifying metadata associated with the application (e.g., instructions to update a version identifier to reference the new version of the application).

In some embodiments, a subscribe (install), unsubscribe (uninstall), update, or reinstall request can come from three different sources. For example, it may be submitted by an IT administrator of the customer organization, by an end user within the customer organization, or as a system action (e.g., when a new virtual desktop instance is built or rebuilt). However, these requests may all result in the initiation of the same workflow (i.e., the same sequence of actions) regardless of the source of the request. For example, in some embodiments, the sequence of actions taken when a virtual application is launched may include a file system filter driver intercepting I/O requests that are directed to files or registers, and the applications delivery agent requesting and receiving a license key for the application run, after which the execution of the application may begin.

In another example, a subscribe sequence may include sending a notification to the application fulfillment platform to initiate a "create fulfillment" workflow, then waiting for a response notification to be posted to the appropriate queue on the application fulfillment control plane. In this example, a long polling thread of the application delivery agent (which may pass the security token for the device, the unique identifier of the device, and the unique identifier of the end user) may look for and retrieve a message from a queue service that includes instructions for the agent to install the requested application (which may include retrieving a virtualized application package, decrypting it, virtualizing it for execution on the device, and/or other steps), and may notify the application fulfillment platform control plane and a desktop application management module (once it is installed on the device) that the installation of the requested application is complete.

Similarly, an unsubscribe sequence may include a long polling thread of the application delivery agent (which may pass the security token for the device, the unique identifier of the device, and the unique identifier of the end user) looking for and retrieving a message from a queue service that includes instructions for the agent to revoke the entitlement for the specified application (which may include the application deliver agent removing a locally stored copy of a license key, removing the application itself from the device, and then notifying the application fulfillment platform control plane and a desktop application management module that is installed on the device that the removal of the specified application is complete.

As described herein, a reinstall sequence may be invoked to fulfill some or all of the applications to which an end user is entitled after their virtualized computing resource instance and/or virtual desktop instance is rebuilt. As previously noted, in some embodiments, a user's application data (e.g., application state and/or scratch data, or application state information or application templates stored in application data storage) may remain with an end user even if the end user subsequently executes the application on another physical computing device, virtualized computing resource instance, and/or virtual desktop instance. In such embodiments, if an end user installs an application to which the end user is entitled on a different virtualized computing resource instance or a different virtual desktop instance than the one on which the end user previously installed the application, any application data generated for, during, or by the previous installation may be brought along with the new installation and applied when executing the application on the new virtualized computing resource instance or on a different virtual desktop instance. For example, if the customer organization is changed for virtual desktop instances on an hourly basis, and if an end user shuts down their virtual desktop instance when they leave the office at the end of the day and log back in when they get home that night or when they return to the office the next day, the systems described herein may be configured to rebuild a virtual desktop instance for the end user that is set up the way the end user left it. Note that when a virtual desktop instance is rebuilt for an end user, it may or may not be implemented on the same virtualized computing resource instance or underlying physical machine as the one on which the end user's virtual desktop instance was previously implemented. Therefore, the agent may be configured to associate (through the registration/authentication process) the new virtual desktop instance with the end user (e.g., the security token for the device may be bound to the end user).

Figure 9:
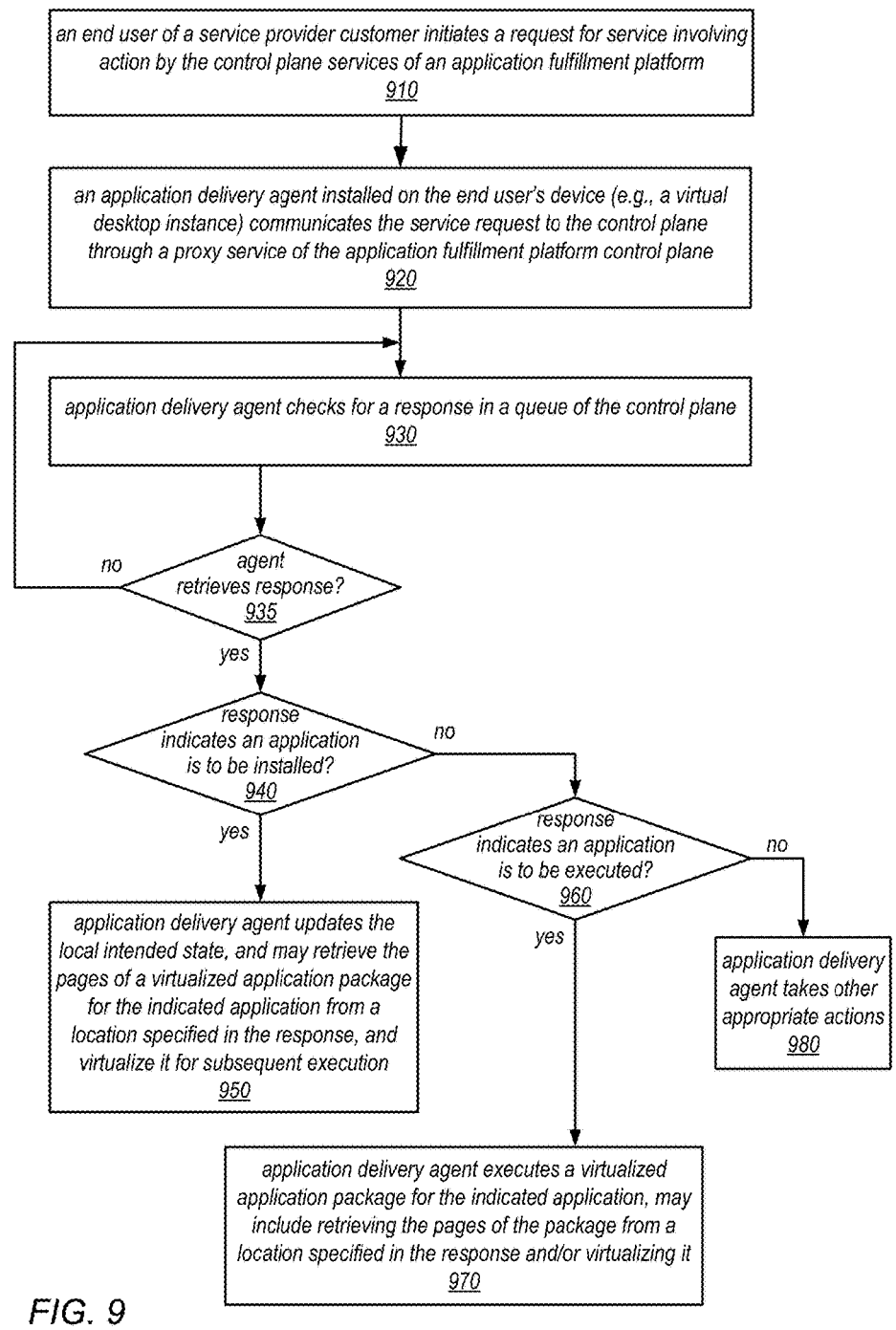
FIG. 9 is a flow diagram illustrating one embodiment of a method for an application delivery agent to manage service requests initiated by end users.

One embodiment of a method for an application delivery agent to manage service requests initiated by end users is illustrated by the flow diagram in FIG. 9. As illustrated at 910, in this example, the method may include an end user of a service provider customer initiating a request for service that involves one or more actions by the control plane services of an application fulfillment platform. In some embodiments, the request for service may be initiated through a desktop application management module that is installed on the virtual desktop instance. The method may also include an application delivery agent that is installed on the end user's device (e.g., a virtual desktop instance) communicating the service request to the control plane through a proxy service of the application fulfillment platform control plane 920, and the request communicated to the proxy service may include one or more identity resources (such as unique identifiers and/or security tokens for the end user or the end user's device). Note that in other embodiments, when an action is initiated through the desktop application management module, the desktop application management module may communicate a corresponding service request to control plane through the proxy service and then notify the agent.

As illustrated in this example, the method may include the application delivery agent checking for a response message in a queue of the control plane, as in 930. Note that in some embodiments, the application delivery agent may be able to access the queue directly (rather than though a proxy service) when presenting a device-level security token. As illustrated in FIG. 9, until and unless the application delivery agent retrieves a response message (shown as the positive exit from 935), the method may include the agent checking the queue repeatedly (e.g., periodically, based on an event-based trigger, or when the agent is not otherwise busy). In some embodiments, the response message may represent a positive response to a user-initiated request to execute an application, to subscribe to an application, or to reinstall an application that is delivered as a virtualized application package.

Once the agent retrieves the response message, shown as the positive exit from 935, if the response indicates that an application is to be installed, shown as the positive exit from 940, the method may include the application delivery agent updating the local intended state, and may also include retrieving the pages of a virtualized application package for the indicated application from a location specified in the response, and virtualize it for subsequent execution, as in 950 (e.g., if the virtualized application package has not already been delivered to the virtual desktop instance). in some embodiments, the method may also include, prior to receiving a response that includes installation instructions, the agent requesting and receiving an indication that the end user and device are entitled to the application (not shown).

As illustrated in this example, if the response message does not indicate that an application is to be installed, but the response message indicates that an application is to be executed, shown as the positive exit from 960, the method may include the application delivery agent executing a virtualized application package for the indicated application, as in 970, which may include retrieving the pages of the package from a location specified in the response and/or virtualizing the virtualized application package. In some embodiments, the method may also include, prior to receiving a response that includes execution instructions, the agent requesting and receiving a license key for this particular run of the specified application (not shown).

If the response does not include an indication that an application is to be installed or executed on behalf of the end user, shown as the negative exit from 960, the method may include the application delivery agent taking one or more other actions, as appropriate (as in 980). For example, in some embodiments, the application delivery agent may be configured to record the response message (or its content), pass the response message to the desktop application management module or end user (e.g., to return indication of service request failure to desktop application management module), uninstall an application from the virtual desktop instance, or update an intended state for applications on the virtual desktop instance or other locally stored information, based on the content of the response.

As previously noted, an application delivery agent installed on an end user's computing resource instances may submit service requests to the application fulfillment platform on its own behalf, in some cases. For example, if the agent wishes to fetch a message from the outbound channel (e.g., queue) for its computing resource instance, the proxy service may present the security token to the queue and, once access to the message is verified, return the message to the agent. In another example, the runtime engine portion of the application delivery agent may communicate with the delivery service when installing a virtualized application package on the virtual desktop instance. In this case, the runtime engine component may communicate with the proxy service or with the outbound channel component (queue) on the control plane (e.g., one that is specific to the device) to receive instructions for retrieving and/or installing the virtualized application package. In some embodiments, a machine-level authentication may be valid when the machine control plane agent needs to communicate with the fulfillment platform control plane on behalf of any and all end users who are logged into the machine.

As described herein, an IT administrator may assign (or grant access to) five applications to a particular end user and the application fulfillment platform control plane may (with the help of the application delivery agent) fulfill those applications to the recipient. However, the machines (e.g., the virtualized computing resources) on which those applications are installed or to which they are delivered may go through various lifecycles, upgrades, and updates (e.g., to the hardware, the operating system, etc.), so it is common that the machines need to be re-imaged or rebuilt at some point. In addition, the end user may want to reinstall something (e.g., the end user may request that all of the applications on their device be uninstalled and reinstalled). Note that, in some cases, even if a device (e.g., a virtual desktop instance) is deleted or rebuilt, or if an application is uninstalled and not reinstalled, if the IT administrator has already paid for a subscription (e.g., a monthly subscription) to those applications, they will be charged for them even if not all of them are being used.

In some embodiments, if the end user requests that their virtual desktop instance be rebuilt (giving them a new instance), the most recent user profile information and any stored application state or scratch data may be restored to the new instance, but the applications that were installed on the previous instance would also need to be reinstalled on the new instance. In some embodiments, the application fulfillment platform control plane may be configured to detect that the end user has a new device and to determine that none of the applications of its intended state are actually installed on the new device. For example, in some embodiments, the fulfillment service of the application fulfillment platform may be configured to keep track of all of the applications to which the end user is entitled (e.g., at a user level) and the delivery service may be configured to keep track of the intended state of the applications for the end user on the virtual desktop instance (e.g. per user per device). Therefore, the intended state information maintained by these control plane services indicates a list of applications that should be fulfilled on the new device. In one example, if the intended state information maintained by the control plane services indicates that a user1 is supposed have applications A, B, C, D, and E, and the control plane determines that the virtual desktop instance for user1 has been rebuilt, the control plane may initiate the delivery of these five applications to the new device to its intended state for user1. In some embodiments, rather than the intended state for a new device being pushed to the new device by the application fulfillment platform, the application delivery agent, as soon as it registers with the control plane, may contact the control plane to determine the intended state for the user. In this example, the application delivery agent may retrieve information indicating that the intended state for user1 includes applications A, B, C, D, and E, and that the control plane (not realizing that user1's virtual desktop instance has been rebuilt) assumes that the current installation state of the applications on user1's device also includes applications A, B, C, D, and E. In some embodiments, each end user device (e.g., virtualized desktop instance) may maintain a local configuration file (e.g., a configuration file that is stored on or is local to the instance) that lists all of the virtualized applications that are installed on the virtual desktop instance. In this example, the application delivery agent may check its local repository of applications and/or its local configuration file and see that it does not have any applications installed (due to the rebuilding of the virtual desktop instance). The application delivery agent may then initiate workflows to create the intended fulfillments on the new device.

Note that, in some embodiments, the end user may have an option to "reinstall all my apps" that triggers operations to uninstall all of the virtualized applications that are installed on the end user's virtual desktop instance and then reinstall all of them. For example, this sequence of operations may include (after uninstalling all of the virtualized applications) retrieving information about the intended installation state of the applications on the end user's device from the control plane and initiating one or more workflows to fulfill that intended state. In other words, in some embodiments the end user (or application delivery agent) may be able to initiate a reconciliation operation (or determine whether one is needed) by requesting (through various APIs) information from the control plane about the intended installation state and/or the assumed current installation state, rather than the control plane services having to keep contacting the end user (or the application delivery agent) to say "this is what you are supposed to have". This mechanism may give the end user the ability to restore their device to its intended state at any point in time and may also help the IT administrator of the customer organization to ensure that the right applications are available to each of its end users.

Note that, in some embodiments, if a virtual desktop instance is rebuilt, its device identity may remain the same. In such embodiments, when the instance is rebuilt, the applications may be fulfilled to the new instance using a reinstall workflow. In this example, when the end user launches an application on the new instance, the desktop application management module or the application delivery agent may call the entitlement service to obtain a license. If there is already a license activation slot for this user/application combination, the end user may keep the license activation slot, and may receive a new license key for this application run. If the end user does not have a license activation slot, but there are open slots, the entitlement service may give one to the end user and return a license key for this run. If there are no open license activation slots, the entitlement service may return an indication that there are no licenses available.

As previously noted, an IT administrator of a customer organization can mark applications with different installation types. For example, anti-virus software may be marked as "required", meaning that the end user does not get to decide whether to install it. Other applications to which the end user is entitled may be marked as "optional", meaning that the application is discoverable, but that the end user has to take an explicit action to install the application. In other words, the end user can decide to subscribe or unsubscribe to various optional apps, changing the intended installation state for this application/device combination that is maintained on the delivery service (but not on the fulfillment service). If the user requests a subscription to a particular application, that application may be added to the intended state (on the delivery service), so that it will be fulfilled for that user on that device. If the end user unsubscribes, it may be removed from the intended state (on the delivery service) and must be removed from the device. In general, while both users and IT administrators can make changes to the intended installation state for applications (e.g., through an desktop application management modules or an administrator console, respectively), changes to the user level intended state may only be made by the IT administrator, but changes to the intended installation state for a <user, device> tuple may be changed in the delivery service by the IT administrator (for any application) or by the end user (for optional applications only).

In some embodiments, when the IT administrator of a customer organization marks an application's installation type as "request access"), this may indicate that the end user can discover the application, but cannot take any action regarding the application. In this case, if and when the end user requests access to the application, the request may be passed to the fulfillment service, which may notify the IT administrator (e.g., by initiating an approval process). In this example, if the IT administrator approves the request to access the application, this would change the intended installation state of this application for this user from "request access" to "optional". At that point, the end user may not only see the application, but may also take action on the application (e.g., to install/subscribe to the application or, subsequently, to uninstall/unsubscribe to the application). In this example, the fulfillment service may keep track of the updated intended installation state at the user level, and if the user actually installs the application, it may be added to the intended installation state maintained by the delivery service (on demand) and may be subsequently removed by the delivery service (on demand). Note that if an application to which the end user (or a <user, device> tuple) is granted a new entitlement is marked as "required", the fulfillment service may add the application to the intended installation state it maintains and to the assumed current state maintained by the delivery service through an automated workflow, and the application may be delivered to the end user and specified device immediately. For example, if an end user is entitled to access an application, but the application is only available on a particular device, the delivery service may not deliver the application to the end user. In another example, if the IT administrator enters intended state information indicating that a particular end user is entitled to a certain application, the fulfillment service may update the intended installation state it maintains and notify the delivery service that the end user is allowed to have the application on all of the registered devices. Conversely, if the IT administrator enters intended state information indicating that a particular end user is no longer entitled to a certain application, the fulfillment service may delete the application from the intended installation state it maintains and may initiate a workflow to notify the delivery service that the end user is no longer entitled to the application and that is should be removed from all of the devices associated with the end user.

As noted above, in some embodiments, an application delivery agent may, at any time compare the actual installation state of applications on the device on which it is installed with the intended and/or assumed current installation states maintained by the control plane services. For example, the intended state (as defined by the IT administrator) may indicate that user1 should have applications A, B, C, D, and E for the month of June, and the actual state may or may not be exactly the same. For example, the end user may not have all of these applications installed on their device or may even have an application installed that the end user is not supposed to have on their device. In some embodiments, the application delivery agent may periodically call an API of the delivery service to "describe applications", which may return a list of the application that the delivery service assumes are installed on the end user's device. In some embodiments, the agent may be able to specify whether they want to see a list of currently installed applications, pending applications or applications in the intended state that is maintained by the control plane services. For example, a request to describe the applications in the intended state may return a list of applications that includes applications A, B, C, D, and E. A request to describe the current state (as assumed by the control plane services based on what has been requested and/or delivered) may return a list of applications that includes applications A, C, and E. The application delivery agent may determine the difference between these states and may request that applications B and D be reinstalled. Similarly, if the returned intended state information includes applications is A, B, C, D, and E, but the actual state includes A, B, C, D, and F, the agent may send a request to the control plane to uninstall application F.

In some embodiments, the application delivery agent may be configured to perform a process in which the agent periodically checks the intended state, compares it to the actual state, and initiates corrective action, if needed. For example, in some embodiment, there may be a scheduler built into the agent to perform this type of reconciliation check periodically (e.g., once every four hours, once every eight hours or once per day) to reconfirm the actual vs. intended state to make sure the right applications are installed on the right machines/instances.

In some embodiments, the reconciliation checks described herein may be performed automatically under these and/or other circumstances:
1) when a virtualized computing resource instance or virtual desktop instance is rebuilt (i.e., when machine reboots or restarts)
2) when a built-in scheduler is configured to perform this check periodically (e.g., once every two hours, eight hours, or twenty-four hours). Note that the schedule on which reconciliation checks may be performed may depend on what is needed to measure compliance with an applicable service level agreement (e.g., to provide a mechanism to be able to generate compliance reports regarding the contracted availability of applications)
3) when an end user triggers the rebuilding of one or more applications. For example, the end user may request an operation to rebuild a particular application or to "reinstall all my apps" if their virtualized computing resource instance or virtual desktop instance is crashing or not performing well).

Note that an end user may leave their virtual desktop instance in a state that purposely does not match the intended state (e.g., if the end user does not want a particular application cluttering up their desktop or for some other reason), except that the user cannot choose not to install required applications (those with an installation type of "required"). These required applications must be installed and cannot be uninstalled by the end user or the application delivery agent. However, the user may choose when and if to subscribe to any applications that are marked as "optional" and/or to unsubscribe to those applications.

Note that, in some embodiments, when a missing application is being installed as part of a reconciliation operation, the version of the application that is installed may be dependent on one or more settings chosen by the IT administrator of the customer organization. For example, if an auto-update feature is enabled for the application, the latest version may be installed following a rebuilding of the virtualized computing resource instance or virtual desktop instance. If not, the version of the application that was previously installed or that is specified in the intended state information maintained by the application fulfillment platform may be installed.

Figure 10:
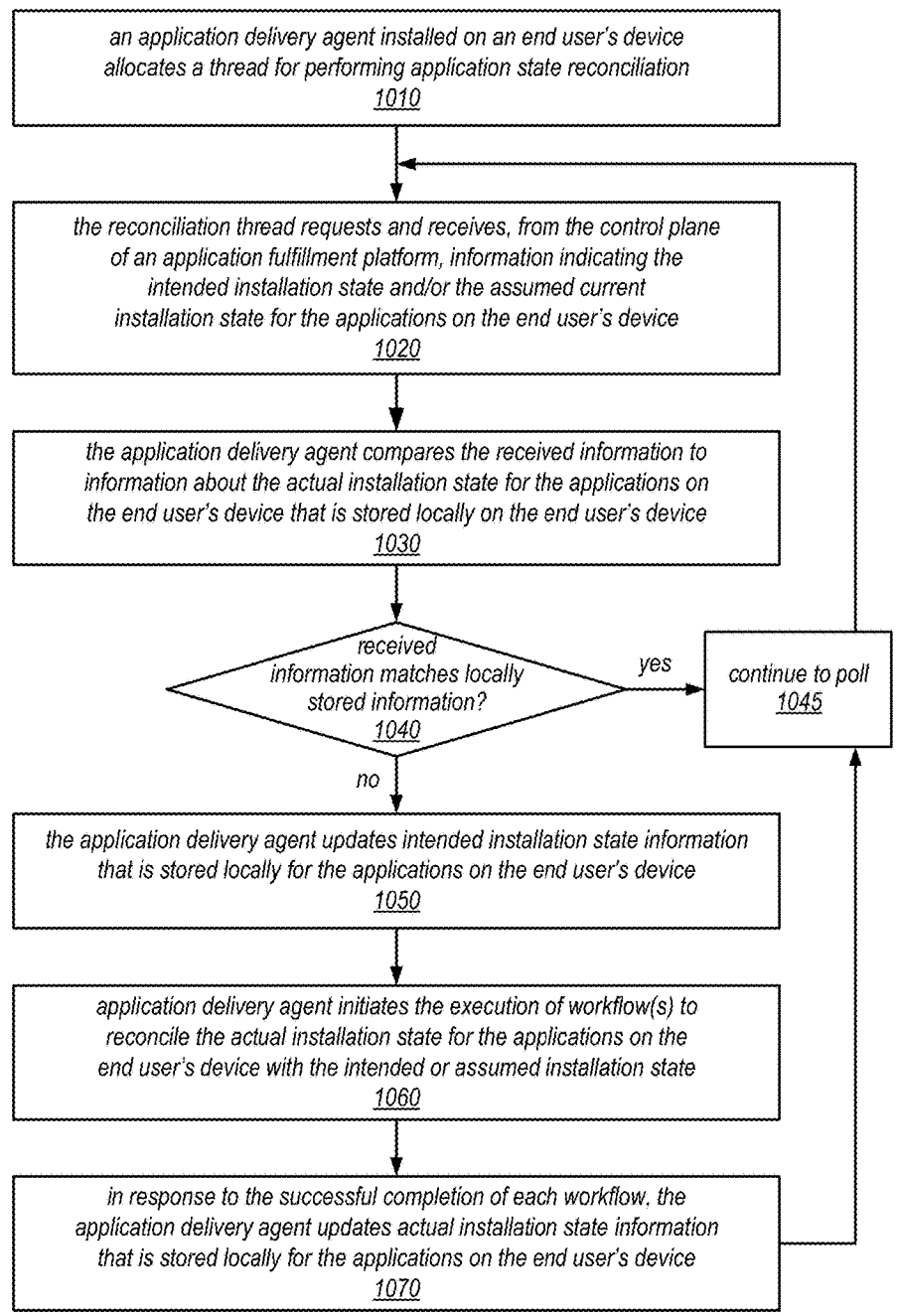
FIG. 10 is a flow diagram illustrating one embodiment of a method for an application delivery agent to implement a reconciliation process for the installation state of applications on an end user's device.

One embodiment of a method for an application delivery agent to implement a reconciliation process for the installation state of applications on an end user's device is illustrated by the flow diagram in FIG. 10. As illustrated at 1010, in this example, the method may include an application delivery agent that is installed on an end user's device (e.g., a virtual desktop instance) allocating a thread (e.g., which may include forking a dedicated long polling thread or periodically, when awakened by a timer task, obtaining a thread from a thread pool) for performing application state reconciliation. For example, the method may include employing a dedicated thread or temporarily allocated thread to access a queue service that is implemented on the control plane of an application fulfillment platform, in some embodiments. The method may include this thread, which may be referred to as a "reconciliation thread" may requesting and receiving, from the control plane of the application fulfillment platform, information indicating the intended installation state and/or the assumed current installation state for the applications on the end user's device, as in 1020. Note that, in some embodiments, an entitlement service of the application fulfillment platform may store, on service provider resources, information about each of the <user, app> entitlements indicating applications to which various end users are entitled (e.g., an intended state). For example, such information may be stored in one or more database service tables or in other types of data structures, files, or objects within service provider storage resources (e.g., by a storage service implemented by the service provider).

As illustrated in this example, the method may include the application delivery agent comparing the received information to information about the actual installation state for the applications on the end user's device that is stored locally on the end user's device, as in 1030. If the received information matches the locally stored information, shown as the positive exit from 1040, the method may include the reconciliation thread (e.g., a dedicated reconciliation thread or the next thread obtained from the thread pool for this purpose) continuing to poll the application fulfillment platform in order to detect any changes in the information stored by the application fulfillment platform that requires reconciliation with the end user's device. This is illustrated in FIG. 10 by the path from the positive exit of 1040 to element 1045 and the path from 1045 to 1020.

If, however, the received information does not match the locally stored information shown as the negative exit from 1040, the method may include the application delivery agent updating intended installation state information that is stored locally for the applications on the end user's device, as in 1050. For example, the application delivery agent may update the intended installation state information based on the received intended installation state information and/or the received assumed current installation state information, depending on which of these states the agent will work toward matching. Note that various differences between these states may be due to that fact that some applications have been marked as required, while others are optional, or due to the fact that the agent may not yet have acted to reconcile the actual state with information that was previously received from the platform. For example, the platform may assume that all optional applications and/or applications marked as "request access" for which a corresponding request to install the application has been received by the platform have actually been installed, but the agent may not have installed all of them in a timely manner.

As illustrated in this example, the method may include the application delivery agent initiating the execution of one or more workflows in order to reconcile the actual installation state for the applications on the end user's device with the intended or assumed installation state information received from the application fulfillment platform, as in 1060. Note that, in some embodiments, each of the workflows may include the entitlement service of the application fulfillment platform updating entitlement records and/or the allocation of license activation slots to the end user and/or to the end user's device (not shown). In response to the successful completion of each workflow, the method may include the application delivery agent updating the actual installation state information that is stored locally for the applications on the end user's device, as in 1070, and the reconciliation thread continuing to poll the application fulfillment platform in order to detect any changes in the information stored by the application fulfillment platform that requires reconciliation with the end user's device. This is illustrated in FIG. 10 by the path from 1070 to element 1045 and the path from 1045 to 1020.

Note that, in some embodiments, the reconciliation thread may continue to poll the application fulfillment platform after initiating one or more reconciliation workflows but before receiving an indication that they have been successfully completed. For example, another thread of the application delivery agent (a thread other than a dedicated reconciliation thread) may retrieve a notification that a reconciliation workflow has been successfully completed, after which it may update the actual installation state information that is stored locally for the applications on the end user's device. In still other embodiments, the reconciliation process illustrated in FIG. 10 may not be performed by a dedicated thread that was spawned for this purpose, but may be performed by any thread spawned by the agent to perform this and other work (at different times).

In some embodiments, the application delivery agent may be configured to take advantage of a thread pool. The thread pool may provide a pool of generic threads that can be executed concurrently. Depending on the complexity of the tasks to be executed by the threads, the thread pool may also be configured to group the threads by types. In such embodiments, within each type, only one thread can be executed at a given time. In some embodiments, a long running worker thread may be used for tasks that need to run constantly, such as the long polling thread that continually (or periodically) checks an outbound queue on the application fulfillment platform control plane for messages or the reconciliation thread described above, and/or for frequent operations that require a single threaded model. As described herein, in some embodiments, the application fulfillment platforms and application delivery agents described herein may implement a queue service that supports long polling, which may reduce extraneous polling associated with empty receives. With long polling, receiving a message from an empty queue may no longer return immediately. Instead, the queue service may waits a little while (e.g., up to 20 seconds) for a message to arrive in the queue, at which point it may returns the message immediately. In some embodiments, long polling may be enabled for entire queues, or alternatively for individual polling requests.

Figure 11:
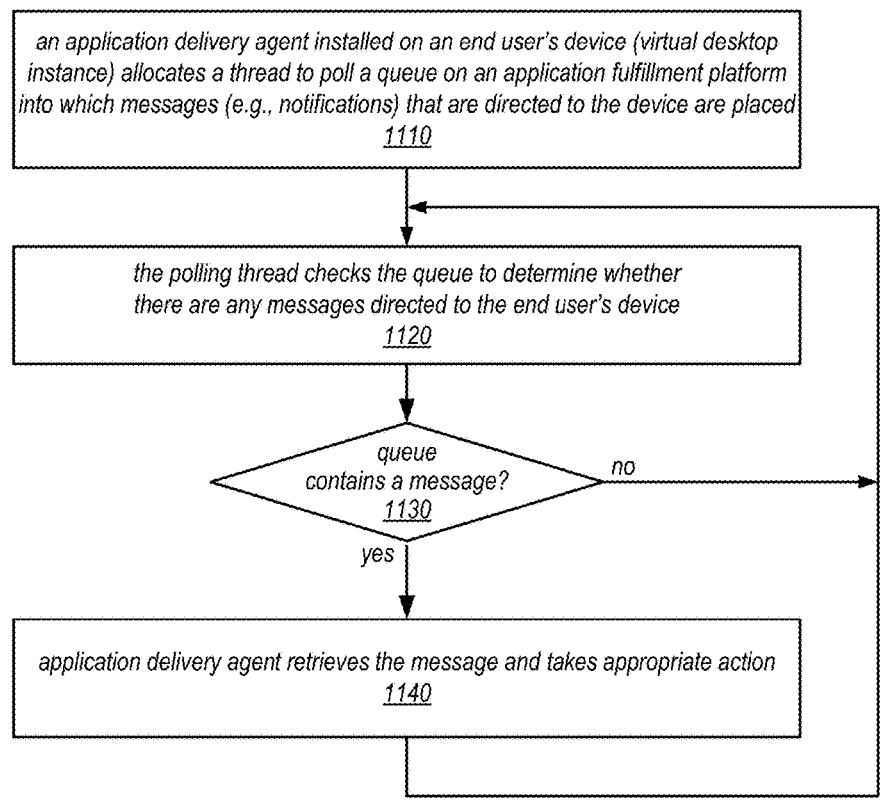
FIG. 11 is a flow diagram illustrating one embodiment of a method for an application delivery agent to retrieve messages from an application fulfillment platform.

One embodiment of a method for an application delivery agent to retrieve messages from an application fulfillment platform (or from control plane services thereof) is illustrated by the flow diagram in FIG. 11. As illustrated at 1110, in this example, the method may include an application delivery agent that is installed on an end user's device (e.g., a virtual desktop instance) allocating a thread to poll a queue on an application fulfillment platform into which messages (e.g., notifications) that are directed to the device are placed. For example, the method may include employing a dedicated long polling thread or various threads that are obtained from a thread pool at different times (e.g., periodically) to access a queue service that is implemented on the control plane of an application fulfillment platform, in some embodiments. The method may also include the polling thread checking the queue to determine whether there are any messages directed to the end user's device, as in 1120. For example, the polling thread may poll for tasks to be performed by the application delivery agent on the virtual desktop instance, or for a response to a previously submitted service request or system-initiated task (e.g., a push of a required or auto-updated application by the application fulfillment platform).

As illustrated in this example, while the queue does not contain any messages that are directed to the end user's device, shown as the negative exit from 1130, the method may include the polling thread continuing to check the queue for messages until and unless a message is found in the queue. However, if (or once) the queue is found to contain a message that is directed to the end user's device, shown as the positive exit from 1130, the method may include the application delivery agent retrieving the message and taking appropriate action, as in 1140. As described herein, the action taken in response to a retrieved message may include initiating a workflow to install, uninstall, update, or reinstall an application on the end user's device, updating application installation state information stored locally on the end user's device, recording a response on the end user's device, and/or passing a response to a desktop application management module that is installed on virtual desktop instance and/or to the end user, in different embodiments.

In various embodiments, the end of the lifecycle for a virtual desktop instance may involve one of the following two things:
  1) An end user may be disassociated from the device. For example, this may be done in response to request by the IT administrator of the customer organization (e.g., entering information indicating that the end user is removed from this device).
  2) The device itself may be terminated. If the device is going to be terminated, the application fulfillment platform would like to know so that it can remove the device or mark the device as not being used any more.

In some embodiments, if an end user is disassociated from a virtual desktop instance, this may trigger one or more actions, which may include one or more of the following:
  The application delivery agent may purge the security token that is associated with this user (e.g., it may erase it from the secure storage in which it is stored on the virtual desktop instance so that it is no longer available or visible on the virtual desktop instance). Note, however, that in this case, it may still be usable in the directory until it expires.
  The control plane may mark this end user as not being on this device any more.

In some embodiments, if the application delivery agent can determine that a virtual desktop instance has been (or is being) terminated (e.g., in response to receiving a notification from the virtual desktop instance that it will soon be, or is being, terminated), the application delivery agent may be configured to proactively send a message (or make a method call) to the application fulfillment platform control plane indicating that this device is being terminated. However, if a virtual desktop instance is terminated without warning (e.g., if it just crashes), the application control plane may be able to determine that it has been terminated (after the fact). For example, in embodiments in which the application delivery agent and the application fulfillment platform control plane participate in a heartbeat protocol, the application fulfillment platform control plane will eventually determine that it has not received a heartbeat message from the application delivery agent for some pre-determined number of heartbeat periods. The application fulfillment platform control plane may, at that point, assume that the virtual desktop instance on which the application delivery agent was installed has been terminated and may mark that device as terminated.

Figure 12:
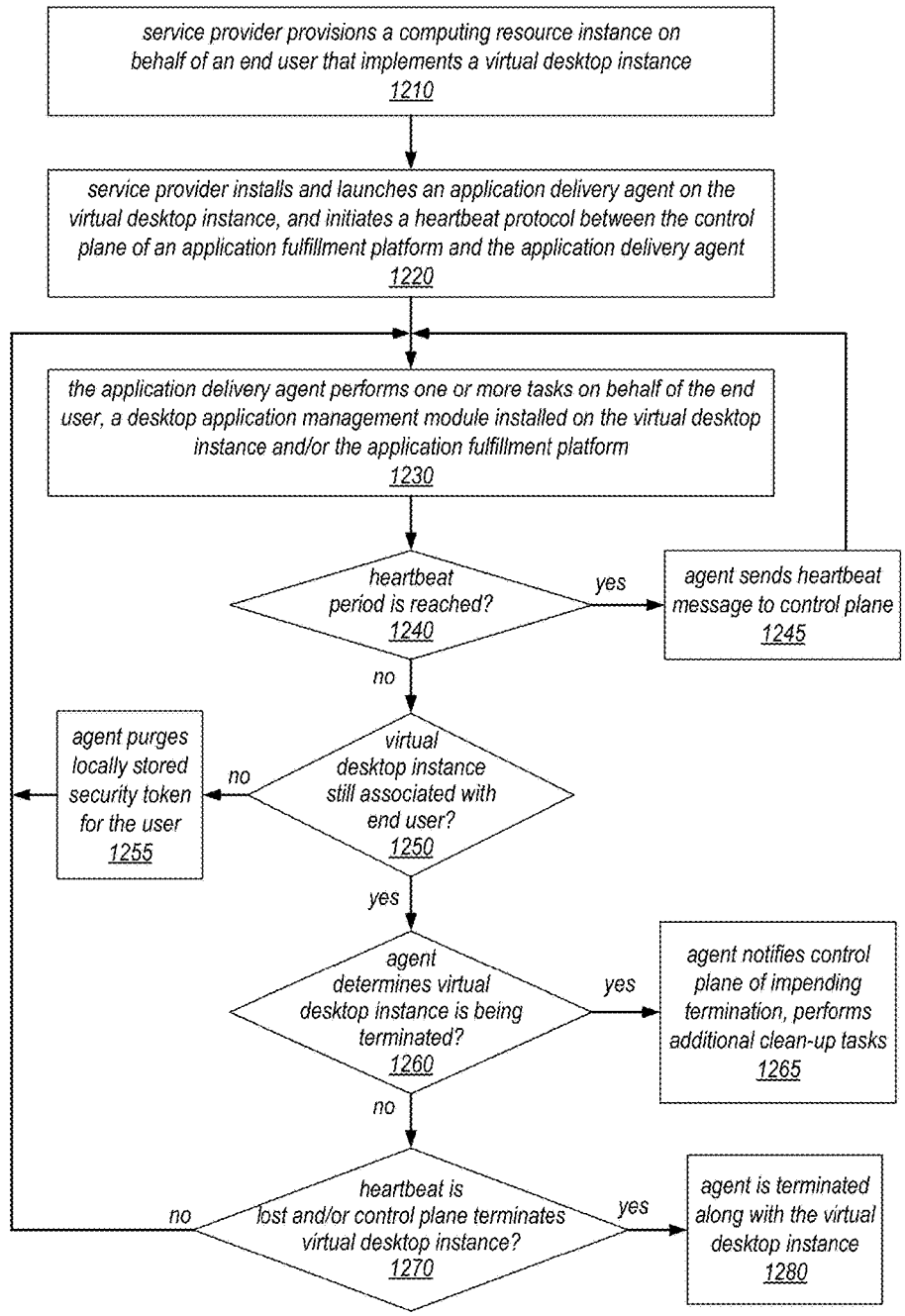
FIG. 12 is a flow diagram illustrating one embodiment of an application delivery agent lifecycle.

One embodiment of an application delivery agent lifecycle is illustrated by the flow diagram in FIG. 12. As illustrated at 1210, in this example, the method may include a service provider provisioning a computing resource instance on behalf of an end user, or more specifically, a computing resource instance that implements a virtual desktop instance. The method may include the service provider installing and launching an application delivery agent on the virtual desktop instance, and initiating a heartbeat protocol between the control plane of an application fulfillment platform and the application delivery agent, as in 1220. In some embodiments, the application fulfillment platform control plane may be able to detect that the virtual desktop instance is still active if it receives the heartbeat messages defined by the protocol on the pre-determined schedule.

As illustrated in this example, the method may include the application delivery agent performing one or more tasks on behalf of the end user, a desktop application management module installed on the virtual desktop instance and/or the application fulfillment platform, as in 1230. For example, the application delivery agent may register a device and/or an end user; communicate service requests to the application fulfillment platform on behalf of the desktop application management module, the agent, or the end user; receive and act on responses to such requests, poll a queue on the application fulfillment platform for tasks (and/or perform them); manage the installation, uninstallation, updating, or reinstallation of an application; or perform a reconciliation process, as described herein. As illustrated in this example, each time the heartbeat period is reached, shown as the positive exit from 1240, the method may include the agent sending a heartbeat message to the application fulfillment platform control plane, as in 1245, after which the application delivery agent may continue to perform tasks on behalf of the end user, a desktop application management module that is installed on the virtual desktop instance and/or the application fulfillment platform. This is illustrated in FIG. 12 by the path from 1245 to 1230.

As illustrated in this example, if, between heartbeat periods, the virtual desktop instance becomes disassociated with the end user, shown as the positive exit from 1250, the method may include the application delivery agent purging a locally stored security token for the user, as in 1255, and then continuing to perform other tasks on behalf of the agent or on behalf of another end user (e.g., if the system allows multiple end users to share a virtual desktop instance and another end user has logged into the virtual desktop instance). This is illustrated in FIG. 12 by the path from 1255 to 1230. If, while the virtual desktop instance remains associated with the end user (shown as the positive exit from 1250), the method may include the application delivery agent determining that the virtual desktop instance is being terminated (shown as the positive exit from 1260), and the application delivery agent notifying the application fulfillment platform control plane of the impending termination (as well as performing any additional clean-up tasks), as in 1265.

As illustrated in this example, if the heartbeat is lost and/or the application fulfillment platform control plane terminates the virtual desktop instance (e.g., without warning, as in 1270, the application delivery agent may be terminated along with the virtual desktop instance, as in 1280. However, while the virtual desktop instance is associated with the end user and is not terminated, the method may include the application delivery agent continuing to perform tasks on behalf of the end user, a desktop application management module that is installed on the virtual desktop instance and/or the application fulfillment platform. This is illustrated in FIG. 12 by the feedback from the negative exit of 1270 to 1230. Note that, while in the example illustrated in FIG. 12 the operations at 1230-1280 are shown in a particular order, these operations may be performed in another order and/or may be performed by different processes in parallel, in various embodiments. For example, the application fulfillment platform control plane may implement a dedicated timer task for the heartbeat protocol that wakes up periodically to send and receive heartbeat messages, rather than sending and receiving these messages using processes that also retrieve and/or perform other types of tasks on behalf of the end user.

In some embodiments, the application fulfillment platforms described herein may provide streamlined application distribution to the end users of a service provider customer. They may provide a fully managed service that improves efficiency and simplify administration with no infrastructure required at the customer. Through these platforms, applications may be deployed on-demand and at scale while maintaining centralized control, security and compliance from an easy-to use management console. The platforms may implement a simple process for subscription set-up that enables quick deployment of applications without on-premise infrastructure, and may allow administrators to control access to applications with granular access policy enforcement on a per user basis. In some embodiments, the application fulfillment platforms described herein may enable a service provider to handle application lifecycle management (specifically around installation, upgrades and patch management) on behalf of its customers.

The application fulfillment platforms described herein may deploy virtualized applications as isolated containers and provide user access to their applications on any authorized device without performing application installs. The application virtualization techniques employed by the application fulfillment platforms may allow applications and application data to be moved from one virtual desktop instance to another, and may allow multiple generations and/or versions of the same application to run concurrently on a single virtual desktop instance as long as there is operating system support. They may also allow legacy applications to be executed in a virtualized environment.

In some embodiments, the application fulfillment platforms described herein may support a pay-as-you-go model in which, for example, customers are billed on a per user per month basis only for the applications they use, and in which an unlimited number of a customer's own line-of-business applications may be deployed to its end users, along with any applications for which the customer has procured licenses from the service provider or an application vendor. The platforms may also allow customers to track and manage application spending with detailed application and license usage reporting on a per application basis. In addition they may allow customers to minimize up-front capital investment by using on-demand subscriptions. In some embodiments, application fulfillment platforms described herein may improve end user productivity by providing self-service access to curated applications on-demand.

Illustrative System

In at least some embodiments, a service that implements some or all of the techniques for providing on-demand delivery of desktop applications to desktops on physical computing devices and/or virtual desktops in a cloud computing environment as described herein may include a computer system that includes or is configured to access a non-transitory computer-accessible (e.g., computer-readable) media, such as computer system 1300 illustrated in FIG. 13. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system 1300 similar to computer system 1300 that has been configured to provide the functionality of those components. In the illustrated embodiment, computer system 1300 includes one or more processors 1310 coupled to a system memory 1320 via an input/output (I/O) interface 1330. Computer system 1300 further includes one or more network interfaces 1340 coupled to I/O interface 1330. In some embodiments, network interfaces 1340 may include two or more network interfaces (including, e.g., one configured for communication between a virtualized computing resource hosted on the computer system 1300 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1340 may be a single network interface.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be multi-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing on-demand delivery of desktop applications to desktops on physical computing devices or virtual desktops in a cloud computing environment, are shown stored within system memory 1320 as code 1327 and data 1326. For example, data 1326 may include information representing the assignment of selected applications to particular end users and/or user groups, constraints and/or configuration parameter settings for the selected applications, users, and catalogs, and may be stored in any of a variety of data structures or database tables within memory 1320 on one or more computing nodes of a service provider system and/or client computing device used in providing on-demand delivery of desktop applications, as described herein. In some embodiments, data 1326 may also include application state data or scratch data, security tokens and/or unique identifiers of users and/or devices (physical computing devices, virtualized computing resource instances and/or virtual desktop instances), or information indicating an intended installation state, an assumed current installation state, or an actual installation state for one or more applications, as described herein. In some embodiments, at least some of the data 1326 may be stored on a user volume within system memory 1320. In some embodiments, code 1327 may include application binaries or virtualized application packages (or portions thereof), a desktop application management module and/or an application delivery agent, at least some of which may be stored on a boot volume within system memory 1320.

In one embodiment, I/O interface 1330 may be configured to coordinate I/O traffic between processor 1310, system memory 1320, and any peripheral devices in the device, including any of network interface(s) 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface(s) 1340 may be configured to allow data to be exchanged between computer system 1300 and other devices 1360 attached to a network or networks 1350, such as other computer systems or devices as illustrated in the figures, for example. In various embodiments, network interface(s) 1340 may support communication via any suitable wired or wireless general data networks, such as types of Ethernet network, for example. Additionally, network interface(s) 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for implementing various embodiments of the techniques for providing on-demand delivery of desktop applications to desktops on physical computing devices and/or virtual desktops in a cloud computing environment described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1300 via I/O interface 1330. A non-transitory computer-accessible (e.g., computer-readable) storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface(s) 1340.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing nodes that collectively provide virtual computing services to one or more clients of a service provider, each of the computing nodes comprising one or more hardware processors and associated memory,
wherein one or more hardware processors of a particular one of the plurality of computing nodes implement:
a virtualized computing resource instance implementing a virtual desktop instance on behalf of a given end user that receives services from the service provider, and an application delivery agent installed on the virtual desktop instance;
wherein one or more hardware processors of one or more other ones of the plurality of computing nodes implement an application fulfillment platform, wherein the application fulfillment platform implements a plurality of control plane services, and wherein the application fulfillment platform comprises an outbound queue from which the application delivery agent can retrieve messages; and
wherein the one or more hardware processors of the particular computing node cause the application delivery agent to:
send, to the application fulfillment platform, a request to access a control plane service implemented on the application fulfillment platform to modify an application portfolio installed on the virtual desktop instance, wherein the request includes a security token, and wherein the security token included in the request is dependent on the type of the service to which access is requested or an entity on whose behalf the request was submitted;
retrieve, from the outbound queue of the application fulfillment platform, a message directed to the virtual desktop instance, wherein the message includes a response to the request that was placed in the outbound queue by the control plane service; and
perform the modification in accordance with one or more instructions to install or uninstall a virtualized application package for a desktop application on the virtual desktop instance, in the response.

2. The system of claim 1,
wherein the one or more hardware processors of the particular computing node cause the application delivery agent to:
send, to the application fulfillment platform, a request to register the virtual desktop instance with the application fulfillment platform as a device, wherein the request to register includes a device identity ticket; and
receive the security token for the device from the application fulfillment platform;
wherein the request to access a control plane service was submitted by the application delivery agent on behalf of the application delivery agent; and
wherein the request for service comprises an identifier of the device and the security token for the device.

3. The system of claim 1,
wherein the one or more hardware processors of the particular computing node cause the application delivery agent to:
send, to the application fulfilment platform, a request to register the given end user with the application fulfillment platform, wherein the request to register includes a user identity ticket received from an active directory service; and
receive the security token for the given end user from the application fulfillment platform;
wherein the request to access a control plane service was submitted by the application delivery agent on behalf of the given end user; and
wherein the request to access a control plane service comprises an identifier of the given end user and the security token for the given end user.

4. The system of claim 1, further comprising performing, via the application delivery agent and it accordance with a second response from the control plane service:
updating a virtualized application package for a desktop application that was previously installed on the virtual desktop instance; or
reinstalling a virtualized application package for a desktop application on the virtual desktop instance that was previously uninstalled from the virtual desktop instance.

5. A method, comprising:
performing, by one or more hardware processors with associated memory implementing an application delivery agent installed on a computing resource instance:
accessing a queue on an application fulfillment platform, wherein the application fulfillment platform is implemented on resources of a service provider, wherein the queue stores messages directed to the computing resource instance to modify an application portfolio of the computing resource instance, and wherein accessing the queue comprises presenting a security credential for the computing resource instance that was previously generated by the application fulfillment platform;
retrieving a message from the queue, wherein the message comprises instructions for performing a task on the computing resource instance; and
performing the task to modify the application portfolio of the computing resource instance, wherein the modification comprises installing or uninstalling a virtualized application package for a desktop application on the computing resource instance, in accordance to the instructions in the message.

6. The method of claim 5,
wherein the method further comprises:
sending, by the application delivery agent to the application fulfillment platform prior to said accessing, a request to access a control plane service implemented on the application fulfillment platform; and
wherein the message was placed in the queue by the control plane service in response to the request to access the control plane service.

7. The method of claim 5,
wherein the security credential comprises one or more of:
a unique identifier of the computing resource instance;
a security token for the computing resource instance;
a unique identifier of an end user of a service provider customer on whose behalf the computing resource was provisioned; or
a security token for the end user of a service provider customer on whose behalf the computing resource was provisioned; and
wherein the method further comprises:
storing, on the computing resource instance by the application delivery agent prior to said accessing, the security credential, wherein said storing comprises encrypting the security credential prior to storage.

8. The method of claim 5, wherein the computing resource instance is a virtual desktop instance that is provisioned on behalf of an end user of a service provider customer.

9. The method of claim 8, wherein the message comprises instructions for performing a task to configure a previously provisioned virtual desktop instance or a previously rebuilt virtual desktop instance.

10. The method of claim 5, further comprising performing, via the application delivery agent and in accordance with a second message from the queue:
updating a desktop application that was previously installed on the computing resource instance; or
reinstalling a desktop application on the computing resource instance that was previously uninstalled from the computing resource instance.

11. The method of claim 5,
wherein the message comprises instructions for performing, by the application delivery agent, delivering the desktop application to the computing resource instance, wherein said delivering the desktop application to the computing resource instance comprises:
retrieving the virtualized application package for the desktop application, wherein the virtualized application package comprises a plurality of pages of virtualized program instructions that represent the desktop application; and
virtualizing the virtualized program instructions for subsequent execution on the computing resource instance.

12. The method of claim 5, wherein said accessing and said retrieving are performed by a dedicated thread of the application delivery agent that is configured to poll the queue periodically to determine whether it contains any messages that are directed to the computing resource instance.

13. The method of claim 5, further comprising:
sending, by the application delivery agent to the application fulfillment platform, a request for information about an intended installation state for applications on the computing resource instance or an assumed current installation state for applications on the computing resource instance; and accessing the queue to retrieve a message comprising the requested information.

14. The method of claim 13, further comprising:

storing, on the computing resource instance by the application delivery agent, information reflecting an actual installation state for applications on the computing resource instance;

comparing the stored information reflecting an actual installation state for applications on the computing resource instance with the requested information;

determining one or more differences between the stored information and the requested information; and initiating a workflow to reconcile the actual installation state for applications on the computing resource instance with the requested information.

15. The method of claim 14, wherein said storing, said comparing, and said determining are performing by a dedicated thread of the application delivery agent that is configured to perform said storing, said comparing, and said determining periodically.

16. The method of claim 5, further comprising:

sending, by the application delivery agent to the application fulfillment platform on a pre-determined schedule, a plurality of messages specified by a heartbeat protocol.

17. The method of claim 5, further comprising:

determining, by the application delivery agent, that the computing resource instance has been or is soon will be dissociated from an end user of a service provider customer on whose behalf it was provisioned; and in response to said determining, deleting a security credential that is associated with the end user from the computing resource instance.

18. The method of claim 5, further comprising:

determining, by the application delivery agent, that the computing resource instance is to be terminated; and in response to said determining, notifying the application fulfillment platform that the computing resources is to be terminated.

19. A non-transitory computer-readable storage medium storing program instructions that when executed on one or more computers cause the one or more computers to implement a virtual desktop instance and an application delivery agent that is installed on the virtual desktop instance;

wherein in response to initiation of the execution of the application delivery agent, the program instructions cause the application delivery agent to perform:

accessing a queue on an application fulfillment platform, wherein the queue is configured to store messages that are directed to the virtual desktop instance to modify an application portfolio of the virtual desktop instance;

retrieving one or more messages from the queue, each message comprising instructions for performing a pending configuration task on the virtual desktop instance;

performing at least one of the pending configuration tasks included in the one or more messages to modify the application portfolio of the virtual desktop instance, wherein the modification comprises installing or uninstalling a virtualized application package for a desktop application on the virtual desktop instance.

20. The non-transitory computer-readable storage medium of claim 19, wherein the program instructions when executed on the one or more computers cause the one or more computers to deliver the desktop application to the virtualized desktop instance, wherein performing the delivery comprises:

retrieving a virtualized application package for the desktop application, wherein the virtualized application package comprises a plurality of pages of virtualized program instructions that represent the desktop application; and virtualizing the virtualized program instructions for subsequent execution on the virtual desktop instance.

* * * * *